US012665706B2

(12) United States Patent
Grieco

(10) Patent No.: US 12,665,706 B2
(45) Date of Patent: Jun. 23, 2026

(54) POWER SAVING ENHANCEMENT FOR SIDELINK

(71) Applicant: TOYOTA JIDOSHA KABUSHIKI KAISHA, Toyota (JP)

(72) Inventor: Donald M. Grieco, Manhasset, NY (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 504 days.

(21) Appl. No.: 18/029,535

(22) PCT Filed: Oct. 13, 2021

(86) PCT No.: PCT/JP2021/037904
§ 371 (c)(1),
(2) Date: Mar. 30, 2023

(87) PCT Pub. No.: WO2022/080415
PCT Pub. Date: Apr. 21, 2022

(65) Prior Publication Data
US 2023/0370210 A1     Nov. 16, 2023

Related U.S. Application Data

(60) Provisional application No. 63/091,737, filed on Oct. 14, 2020.

(51) Int. Cl.
*H04L 1/1829* (2023.01)
*H04L 5/00* (2006.01)
(Continued)

(52) U.S. Cl.
CPC .......... *H04L 1/1861* (2013.01); *H04L 1/1854* (2013.01); *H04L 5/0055* (2013.01);
(Continued)

(58) Field of Classification Search
CPC ... H04L 1/1861; H04L 1/1854; H04L 5/0055; H04W 72/25; H04W 74/0808; H04W 74/0833; H04W 74/0836; H04W 74/0838
See application file for complete search history.

(56) References Cited

U.S. PATENT DOCUMENTS

2020/0052831 A1* 2/2020 Yang ..................... H04L 1/1812
2020/0100284 A1* 3/2020 Li ........................ H04W 74/002
(Continued)

FOREIGN PATENT DOCUMENTS

JP        2013-062776 A      4/2013
WO    WO 2020/184955 A1   9/2020

OTHER PUBLICATIONS

Fujitsu, Considerations on partial sensing in NR V2X, 3GPP TSG RAN WG1 #102-e R1-2005545 https://www.3gpp.org/ftp/tsg ran/ WG1 RL1/TSGR1 102-e/Docs/R1-2005545.zip Aug. 7, 2020, 8 pgs.

(Continued)

*Primary Examiner* — Edan Orgad
*Assistant Examiner* — Malick A Sohrab
(74) *Attorney, Agent, or Firm* — Finnegan, Henderson, Farabow, Garrett, and Dunner, LLP

(57)                    ABSTRACT
A system, method and apparatus for mobile communications including sidelink transmissions is provided. A user equipment (UE) determines based on a partial sensing resource allocation process associated with a first window size, first radio resources for one or more first sidelink transport blocks. The UE transmits the one or more first sidelink transport blocks based on the first radio resources. The UE receives hybrid automatic repeat request (HARQ) feedback based on a first number of number of negative acknowledgements (NACKs) and a second number of positive acknowledgements (ACKs). Based on application of a threshold, the UE determines second radio resources for one
(Continued)

or more second sidelink transport blocks. The UE transmits the one or more second sidelink transport blocks based on the second radio resources.

18 Claims, 21 Drawing Sheets

(51) Int. Cl.

| | |
|---|---|
| *H04W 72/25* | (2023.01) |
| *H04W 74/0808* | (2024.01) |
| *H04W 74/0833* | (2024.01) |
| *H04W 74/0836* | (2024.01) |
| *H04W 74/0838* | (2024.01) |

(52) U.S. Cl.
CPC ....... *H04W 72/25* (2023.01); *H04W 74/0808* (2013.01); *H04W 74/0833* (2013.01); *H04W 74/0836* (2024.01); *H04W 74/0838* (2024.01)

(56) References Cited

U.S. PATENT DOCUMENTS

| | | | | |
|---|---|---|---|---|
| 2021/0167933 A1* | 6/2021 | Sambale | ............... | H04L 5/0044 |
| 2022/0046620 A1* | 2/2022 | Ye | ......................... | H04W 72/20 |
| 2022/0078753 A1* | 3/2022 | Park | ...................... | H04W 28/02 |
| 2022/0174648 A1* | 6/2022 | Dong | ................ | H04W 72/0453 |
| 2022/0201654 A1* | 6/2022 | Lee | ...................... | H04L 5/0053 |
| 2023/0224960 A1* | 7/2023 | Sarkis | ............... | H04W 74/0808 |
| | | | | 370/329 |

OTHER PUBLICATIONS

Ericsson, Resource allocation mechanisms for power saving, 3GPP TSG RAN WG1 #102-e R1-2006444, https://www.3gpp.org/ftp/tsg ran/WG1 RL1/TSGR1 102-e/Docs/R1-2006444.zip Aug. 7, 2020, 5 pgs.

LG Electronics, "Discussion on Resource Allocation for Power Saving", dated Aug. 8, 2020, 5 pages.

3rd Generation Partnership Project, "3GPP TS 38.214 V16.6.0", dated Jun. 1, 2021 (including Section 8), pp. 1-172.

3rd Generation Partnership Project, "3GPP TS 38.321 V16.5.0", dated Feb. 1, 2018 (including Section 5.8.3), pp. 1-157.

* cited by examiner

| Transport channel / Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Physical channel / Transport channel | PDSCH | PDCCH | PBCH |
|---|---|---|---|
| BCH | | | X |
| PCH | X | | |
| DL-SCH | X | | |

| Physical channel / Transport channel | PUSCH | PUCCH | PRACH |
|---|---|---|---|
| UL-SCH | X | | |
| RACH | | | X |

| Physical channel / Transport channel | PSSCH | PSCCH | PSFCH | PSBCH |
|---|---|---|---|---|
| SL-BCH | | | | X |
| SL-SCH | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

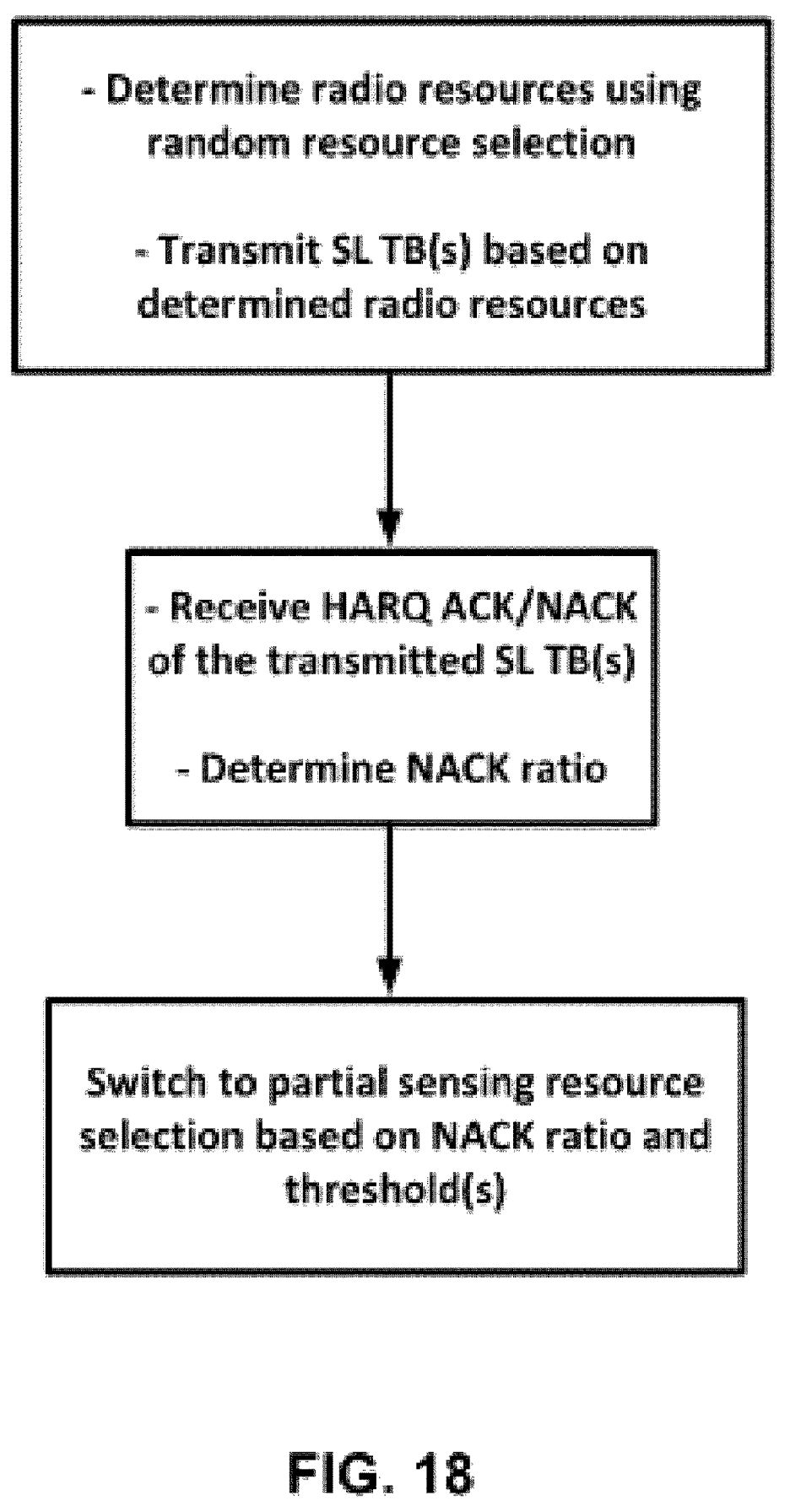

- Determine radio resources using random resource selection

- Transmit SL TB(s) based on determined radio resources

- Receive HARQ ACK/NACK of the transmitted SL TB(s)

- Determine NACK ratio

Switch to partial sensing resource selection based on NACK ratio and threshold(s)

FIG. 18

POWER SAVING ENHANCEMENT FOR SIDELINK

CROSS-REFERENCE TO RELATED APPLICATIONS

This application is a national stage of International Application No. PCT/JP2021/037904, filed Oct. 13, 2021, and is based upon and claims the benefit of priority from U.S. Patent Application No. 63/091,737 filed Oct. 14, 2020, the entire contents of which are incorporated herein by reference.

TECHNICAL FIELD

The disclosure relates to a method for sidelink resource selection.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

In some embodiments of this disclosure, a method for sidelink resource selection is provided. The method includes determining, by a first user equipment (UE), based on a first sidelink resource allocation process, first radio resources for one or more first sidelink transport blocks; transmitting, by the first UE to a second UE, the one or more first sidelink transport blocks based on the first radio resources; receiving, by the first UE, first hybrid automatic repeat request (HARQ) feedbacks for the one or more first sidelink transport blocks; determining, by the first UE, whether to switch from the first sidelink resource allocation process to a second sidelink resource allocation process based on the HARQ feedbacks; determining, by the first UE, in response to a determination to switch to the second sidelink resource allocation process, second radio resources for one or more second sidelink transport blocks based on the second sidelink resource allocation process; and transmitting, by the first UE to the second UE, the one or more second sidelink transport blocks based on the second radio resources.

In some embodiments of this disclosure, a method for sidelink resource selection is provided. The method includes determining, by a first user equipment (UE), based on a partial sensing resource allocation process associated with a first window size, first radio resources for one or more first sidelink transport blocks; transmitting, by the first UE to a second UE, the one or more first sidelink transport blocks based on the first radio resources; receiving, by the first UE, hybrid automatic repeat request (HARQ) feedbacks for the one or more first sidelink transport blocks, wherein the HARQ feedbacks comprise a first number of negative acknowledgements (NACKs) and a second number of positive acknowledgements (ACKs); determining, by the first UE, a NACK ratio of the first number of NACKs to a sum of the first number of NACKs and the second number of ACKs; determining, by the first UE, based on the partial sensing resource allocation process associated with a second window size, second radio resources for one or more second sidelink transport blocks, wherein the second window size is larger than, smaller than or equal to the first window size based on comparing the NACK ratio with one or more thresholds; and transmitting, by the first UE to the second UE, the one or more second sidelink transport blocks based on the second radio resources.

In some embodiments of this disclosure, a first UE for a mobile communication network including sidelink transmissions is provided. The first UE includes a memory storing instructions; and a processor configured to execute the instructions to: determine, based on a first sidelink resource allocation process, first radio resources for one or more first sidelink transport blocks; transmit, to a second UE, the one or more first sidelink transport blocks based on the first radio resources; receive first hybrid automatic repeat request (HARQ) feedbacks for the one or more first sidelink transport blocks; determine whether to switch from the first sidelink resource allocation process to a second sidelink resource allocation process based on the HARQ feedbacks; determine, in response to a determination to switch to the second sidelink resource allocation process, second radio resources for one or more second sidelink transport blocks based on the second sidelink resource allocation process; and transmit, to the second UE, the one or more second sidelink transport blocks based on the second radio resources.

In some embodiments of this disclosure, a second user equipment (UE) for a mobile communication network including sidelink transmissions is provided. The second UE includes a memory storing instructions; and a processor configured to execute the instructions to: receive, from a first UE, one or more first sidelink transport blocks determined by the first UE based on a first sidelink resource allocation process; transmit, to the first UE, first hybrid automatic repeat request (HARQ) feedbacks for the one or more first sidelink transport blocks; and receive, from the first UE, in response to a determination to switch to a second sidelink resource allocation process by the first UE, one or more second sidelink transport blocks determined by the first UE based on the second sidelink resource allocation process.

In some embodiments of this disclosure, a system for a mobile communication including sidelink transmissions is provided. The system includes a first user equipment (UE) configured to determine, based on a first sidelink resource allocation process, first radio resources for one or more first sidelink transport blocks and transmit the one or more first sidelink transport blocks based on the first radio resources; and a second UE configured to receive the one or more first sidelink transport blocks and transmit first hybrid automatic repeat request (HARQ) feedbacks for the one or more first sidelink transport blocks to the first UE. The first UE is further configured to: determine whether to switch from the first sidelink resource allocation process to a second sidelink resource allocation process based on the HARQ feedbacks; determine, in response to a determination to switch to the second sidelink resource allocation process, second radio resources for one or more second sidelink transport blocks based on the second sidelink resource allocation process; and transmit, to the second UE, the one or more second sidelink transport blocks based on the second radio resources. In some embodiments of this disclosure, the system may further include a base station, and the second UE may be configured to transmit the HARQ feedbacks to the first UE via the base station.

In some embodiments of this disclosure, a non-transitory computer readable medium is provided. The non-transitory computer readable medium stores a set of instructions that is executable by at least one processor of a first user equipment (UE) in a mobile communication system including sidelink transmissions to perform a method. The method includes determining, based on a first sidelink resource allocation process, first radio resources for one or more first sidelink transport blocks; transmitting, to a second UE, the one or more first sidelink transport blocks based on the first radio resources; receiving first hybrid automatic repeat request (HARQ) feedbacks for the one or more first sidelink transport blocks; determining whether to switch from the first sidelink resource allocation process to a second sidelink resource allocation process based on the HARQ feedbacks; determining, in response to a determination to switch to the second sidelink resource allocation process, second radio resources for one or more second sidelink transport blocks based on the second sidelink resource allocation process; and transmitting, to the second UE, the one or more second sidelink transport blocks based on the second radio resources.

In some embodiments of this disclosure, a non-transitory computer readable medium is provided. The non-transitory computer readable medium stores a set of instructions that is executable by at least one processor of a second user equipment (UE) in a mobile communication system including sidelink transmissions to perform a method. The method includes receiving, from a first UE, one or more first sidelink transport blocks determined by the first UE based on a first sidelink resource allocation process; transmitting, to the first UE, first hybrid automatic repeat request (HARQ) feedbacks for the one or more first sidelink transport blocks; and receiving, from the first UE, in response to a determination to switch to a second sidelink resource allocation process by the first UE, one or more second sidelink transport blocks determined by the first UE based on the second sidelink resource allocation process.

BRIEF DESCRIPTION OF DRAWINGS

FIG. 3A, FIG. 3B and FIG. 3C show example mappings between logical channels and transport channels in downlink, uplink and sidelink, respectively, according to some aspects of one or more exemplary embodiments of the present disclosure.

FIG. 6 shows example physical signals in downlink, uplink and sidelink according to some aspects of one or more exemplary embodiments of the present disclosure.

FIG. 18 shows an example process according to some aspects of one or more exemplary embodiments of the present disclosure.

DESCRIPTION OF EMBODIMENTS

The following disclosure provides many different embodiments, or examples, for implementing different features of the provided subject matter. Specific examples of arrangements are described below to simplify the present disclosure. These are merely examples and are not intended to be limiting.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
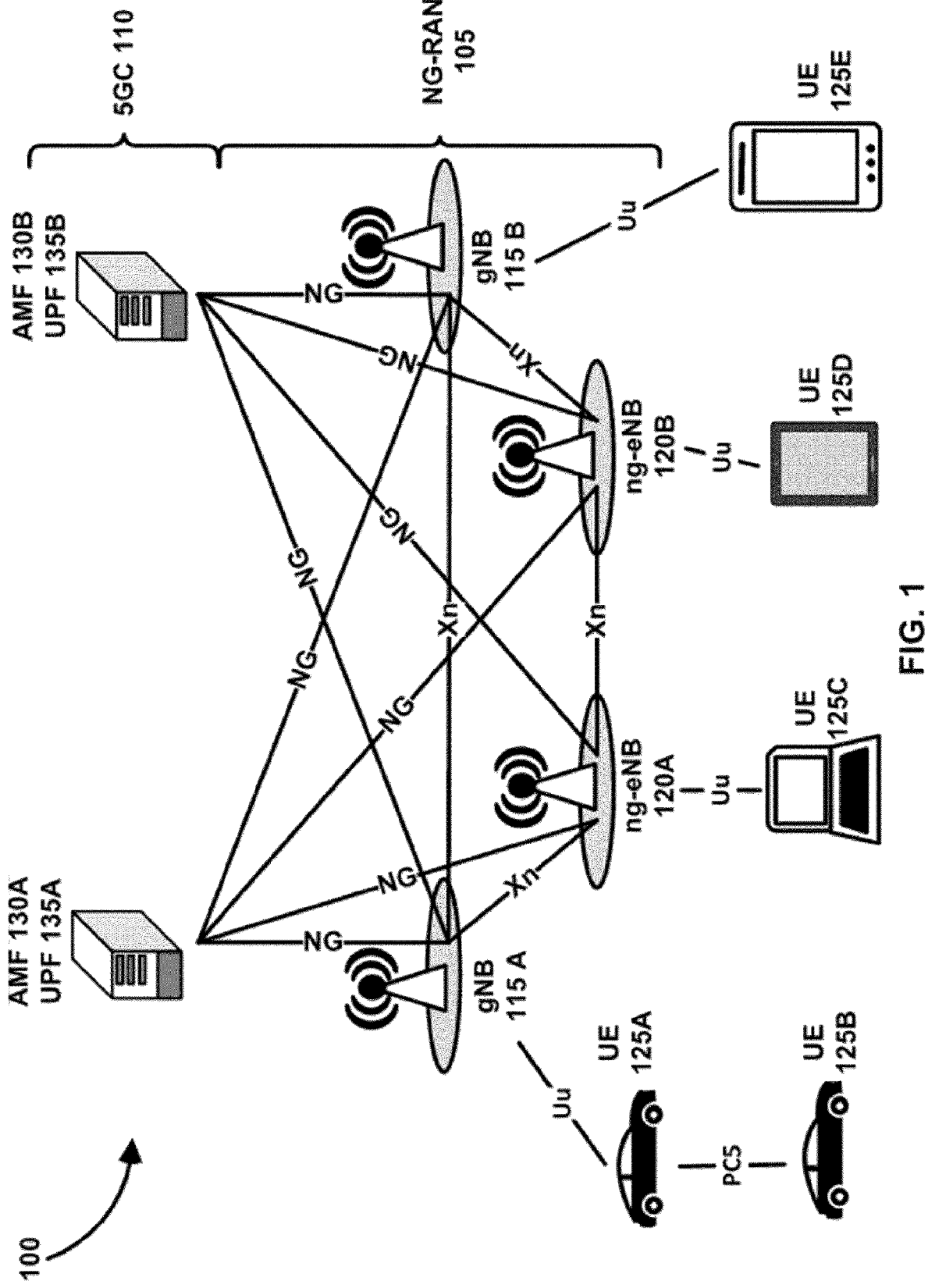
FIG. 1 shows an example of a system of mobile communications according to some aspects of one or more exemplary embodiments of the present disclosure.

FIG. 1 shows an example of a system of mobile communications 100 according to some aspects of one or more exemplary embodiments of the present disclosure. The system of mobile communication 100 may be operated by a wireless communications system operator such as a Mobile Network Operator (MNO), a private network operator, a Multiple System Operator (MSO), an Internet of Things IOT network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 (e.g., UE 125A-UE 125E) and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UEs 125 and the RAN (e.g., the NG-RAN 105) may be referred to as Access Stratum (AS) and the functional layer between the UEs 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of the UEs 125 include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for the UEs 125 such as a Mobile Station (MS), terminal equipment, terminal node, client device, mobile device, etc. Still further, the UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of the NG-RAN 105 may be either a next generation Node B (gNB) 115 (e.g., gNB 115A, gNB 115B) or a next generation evolved Node B (ng-eNB) 120 (e.g., ng-eNB 120A, ng-eNB 120B). In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and General Packet Radio Service (GPRS) Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 (e.g., AMF 130A, AMF 130B) of the 5GC 110 by means of the NG-C interface and to a User Plane Function (UPF) 135 (e.g., UPF 135A, UPF 135B) of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multihomed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the medium access control (MAC) layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the MAC header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
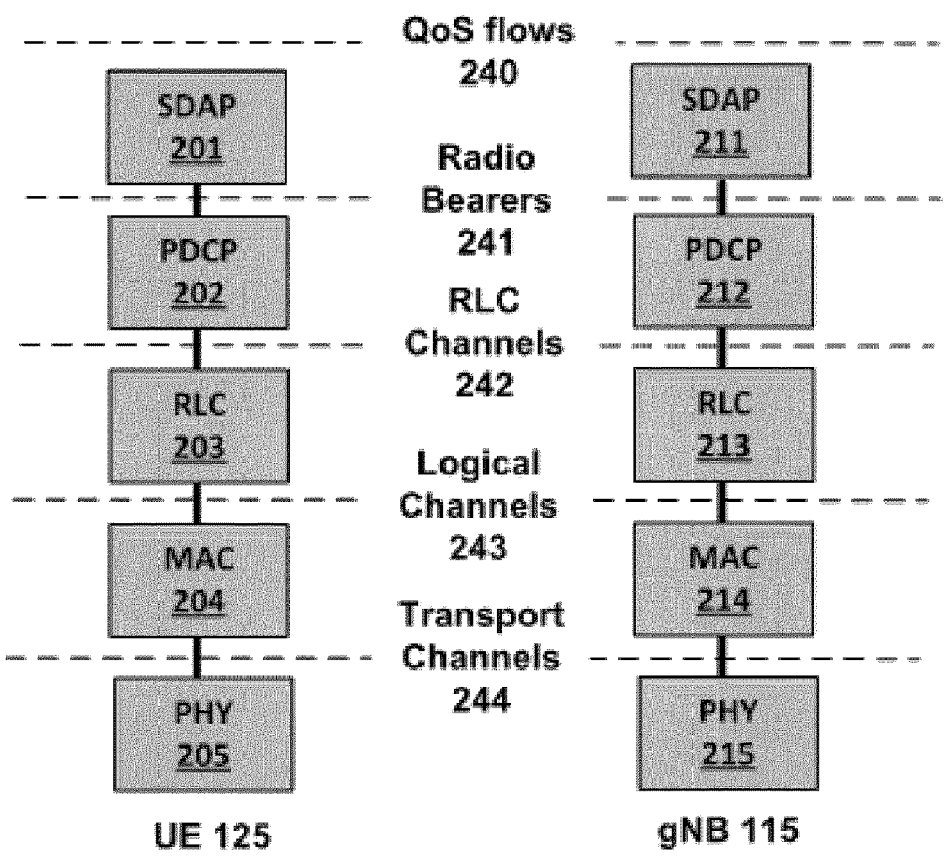
FIG. 2A and FIG. 2B show examples of radio protocol stacks for user plane and control plane, respectively, according to some aspects of one or more exemplary embodiments of the present disclosure.
Figure 2B:
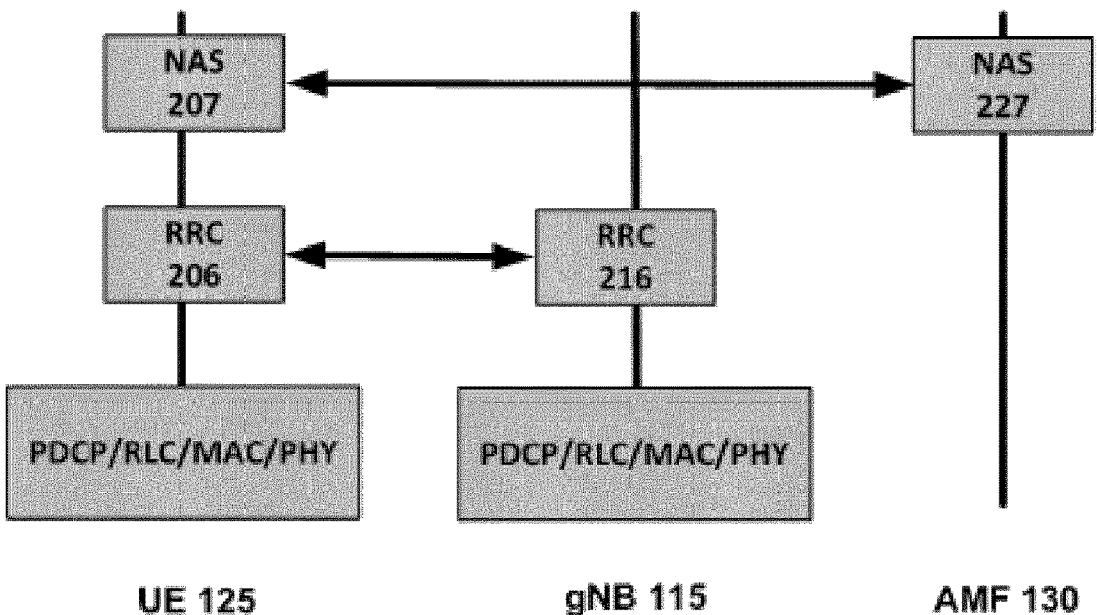

FIG. 2A and FIG. 2B show examples of radio protocol stacks for user plane and control plane, respectively, according to some aspects of one or more exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PDCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and resegmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of one or more exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
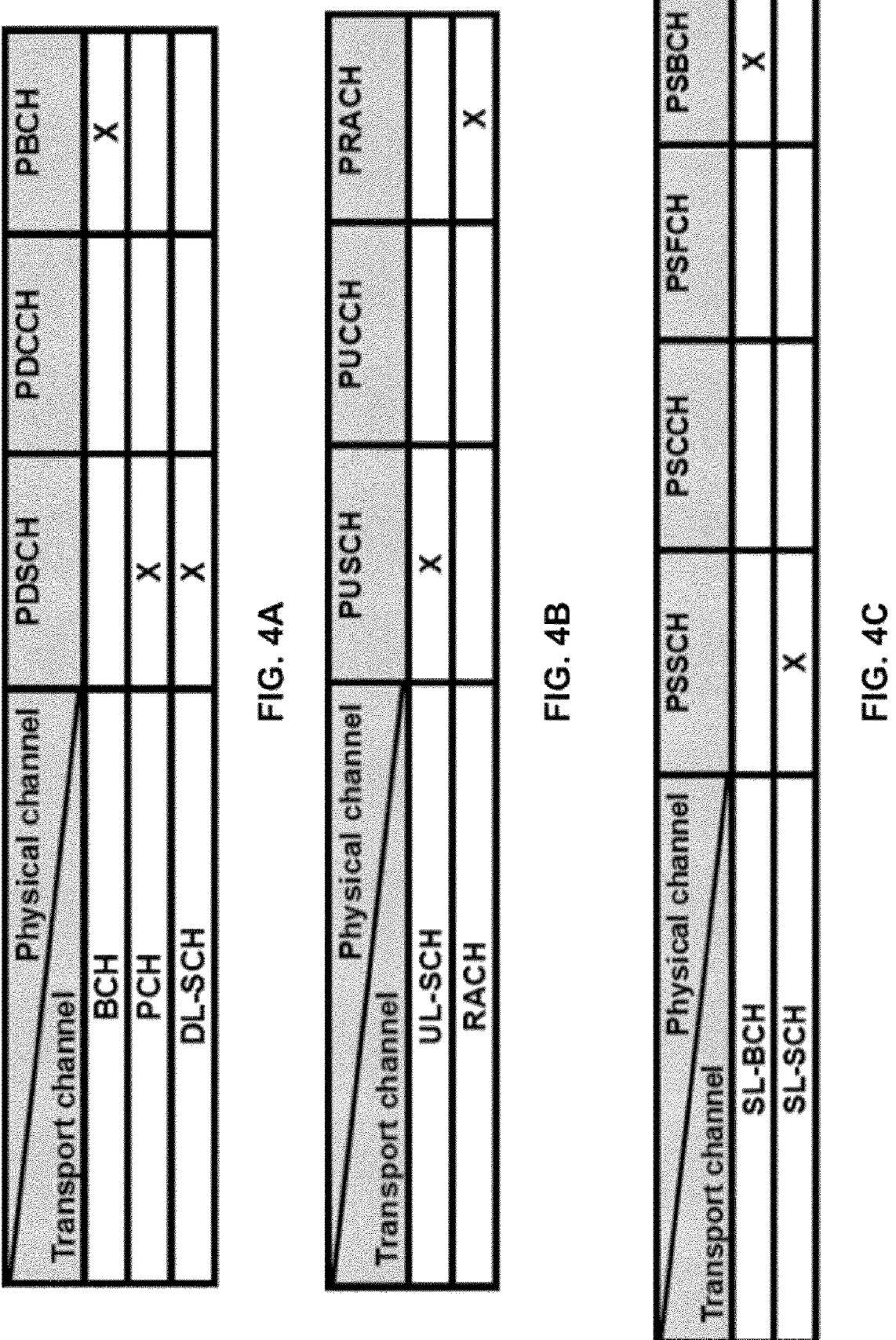
FIG. 4A, FIG. 4B and FIG. 4C show example mappings between transport channels and physical channels in downlink, uplink and sidelink, respectively, according to some aspects of one or more exemplary embodiments of the present disclosure.

FIG. 4A, FIG. 4B and FIG. 4C show example mappings between transport channels and physical channels in downlink, uplink and sidelink, respectively, according to some aspects of one or more exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and Channel State Information (CSI) feedback triggers, etc. At least six Orthogonal Frequency Division Multiplexing (OFDM) symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figures 5A, 5B, 5C, 5D:
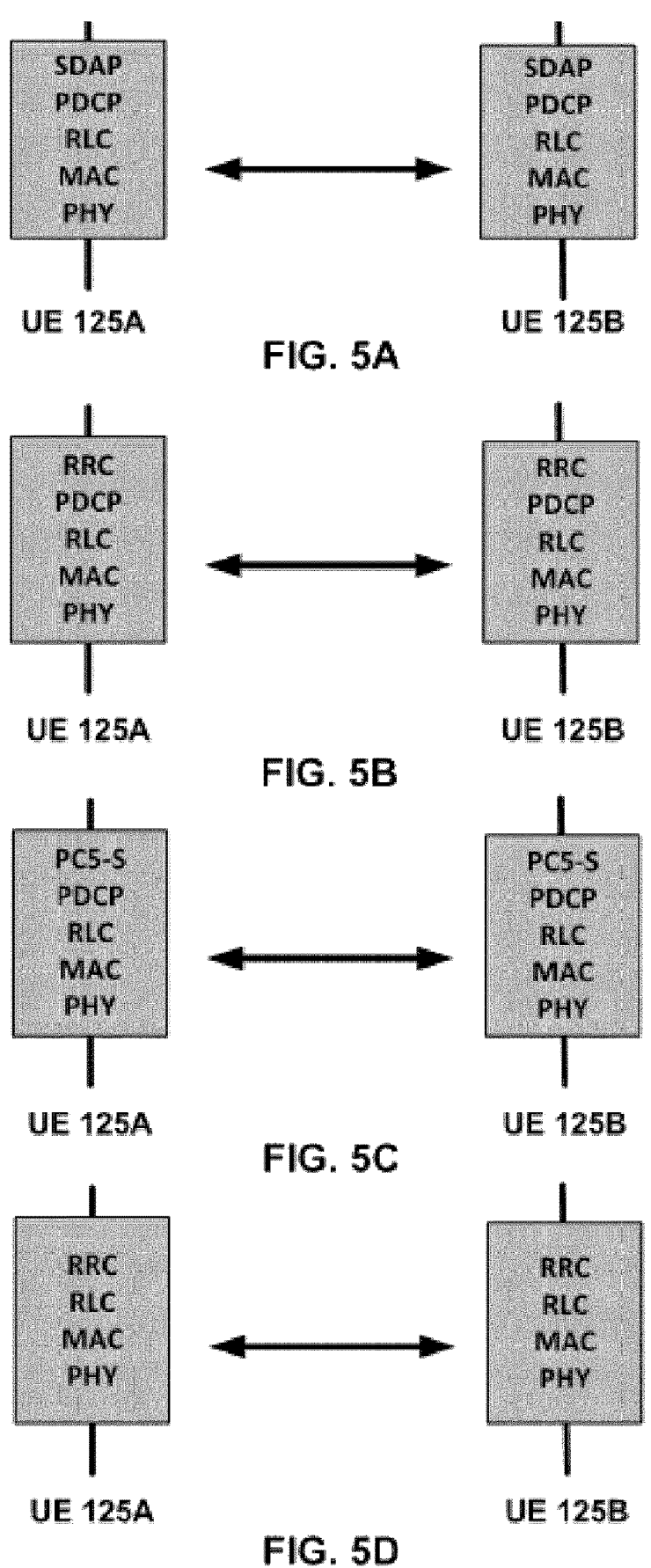
FIG. 5A, FIG. 5B, FIG. 5C and FIG. 5D show examples of radio protocol stacks for NR sidelink communication according to some aspects of one or more exemplary embodiments of the present disclosure.

FIG. 5A, FIG. 5B, FIG. 5C and FIG. 5D show examples of radio protocol stacks for NR sidelink communication according to some aspects of one or more exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of one or more exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC control element (CE). The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
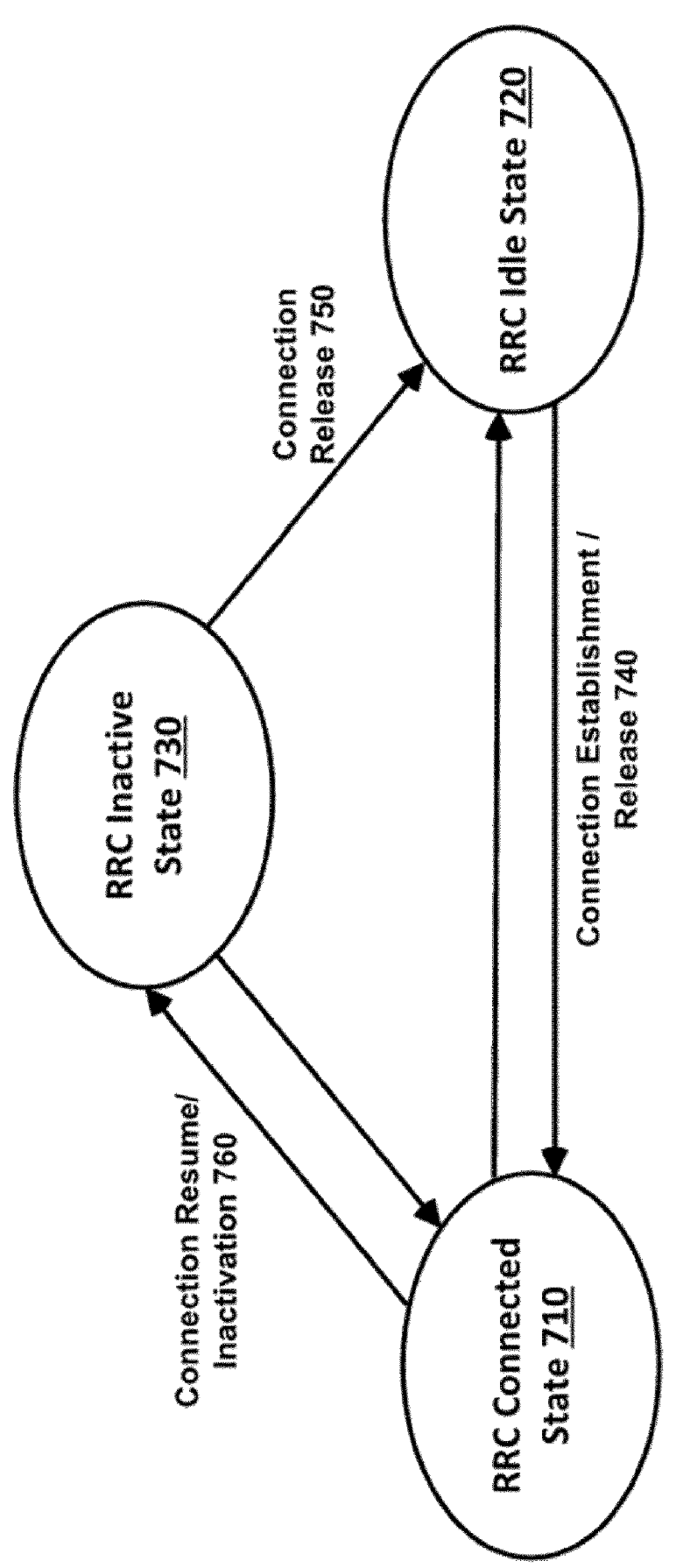
FIG. 7 shows examples of Radio Resource Control (RRC) states and transitioning between different RRC states according to some aspects of one or more exemplary embodiments of the present disclosure.

FIG. 7 shows examples of Radio Resource Control (RRC) states and transitioning between different RRC states according to some aspects of one or more exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
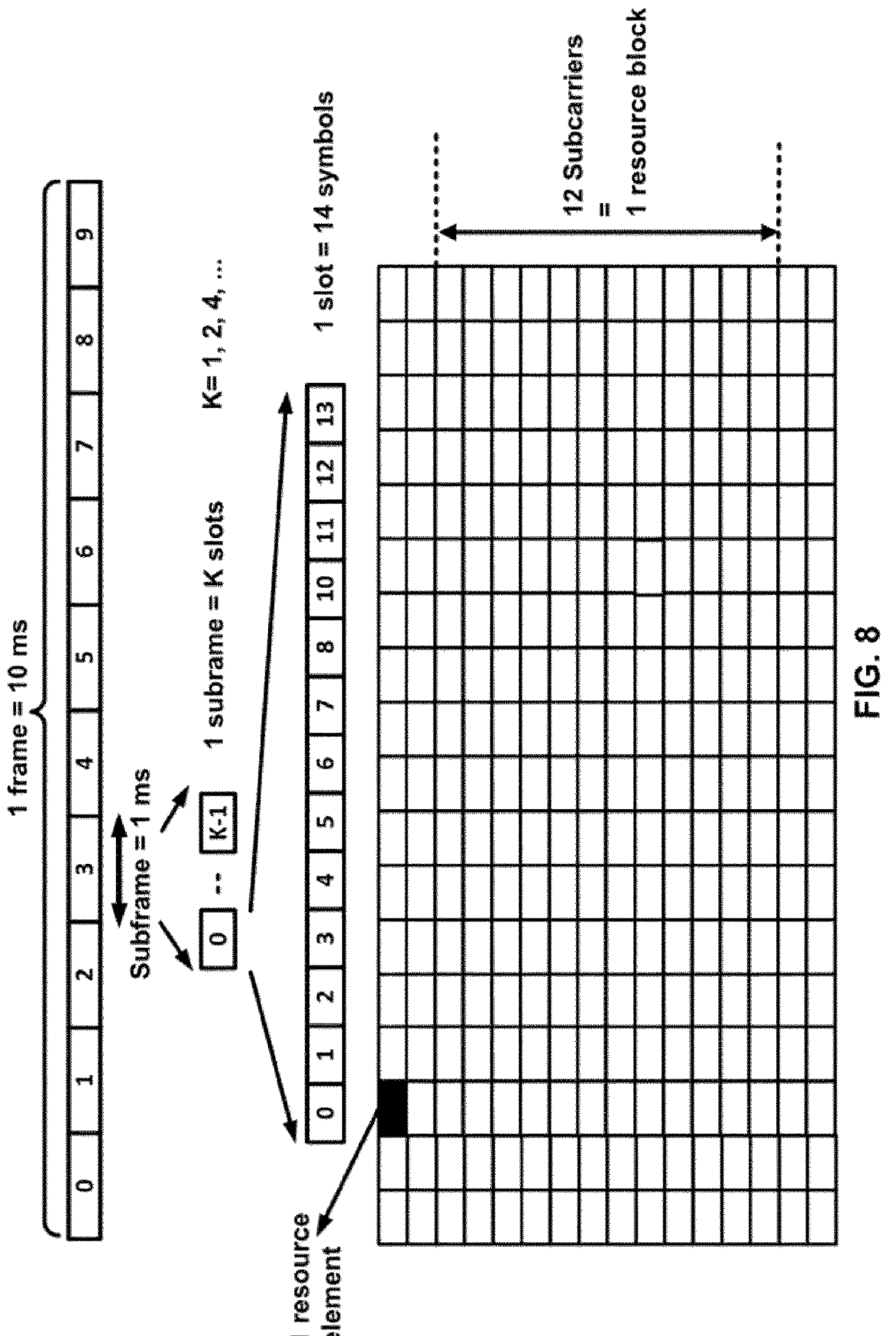
FIG. 8 shows example frame structure and physical resources according to some aspects of one or more exemplary embodiments of the present disclosure.

FIG. 8 shows example frame structure and physical resources according to some aspects of one or more exemplary embodiments of the present disclosure. The downlink or uplink or sidelink transmissions may be organized into frames with 10 ms duration, consisting of ten (0 to 9) 1 ms subframes. Each subframe may consist of k slots (k=1, 2, 4, . . . ), wherein the number of slots k per subframe may depend on the subcarrier spacing of the carrier on which the transmission takes place. The slot duration may be 14 (0 to 13) symbols with Normal Cyclic Prefix (CP) and 12 symbols with Extended CP and may scale in time as a function of the used sub-carrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example, during two, four, or seven OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
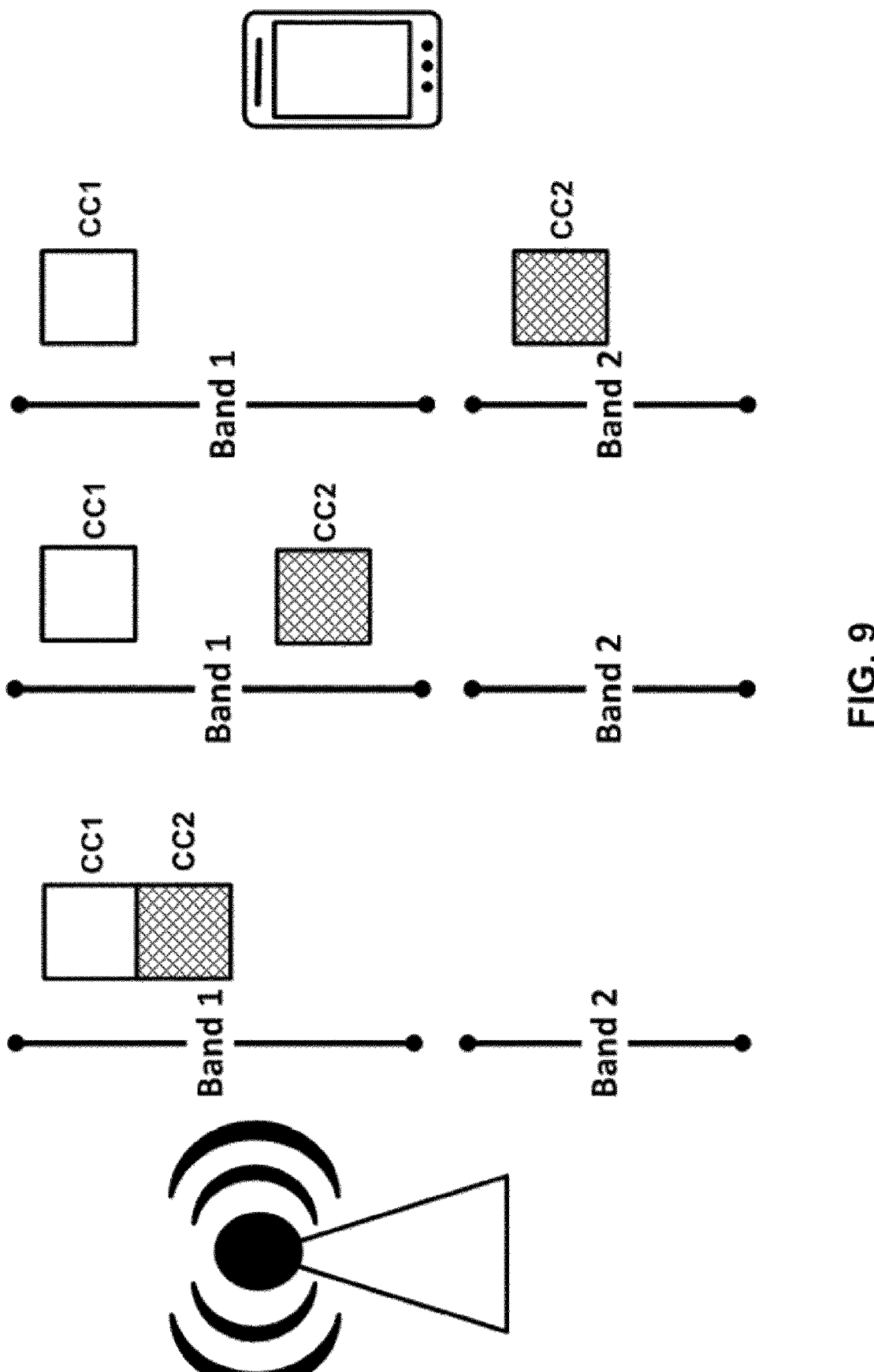
FIG. 9 shows example component carrier configurations in different carrier aggregation scenarios according to some aspects of one or more exemplary embodiments of the present disclosure.

FIG. 9 shows example component carrier configurations in different carrier aggregation scenarios according to some aspects of one or more exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE.

The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
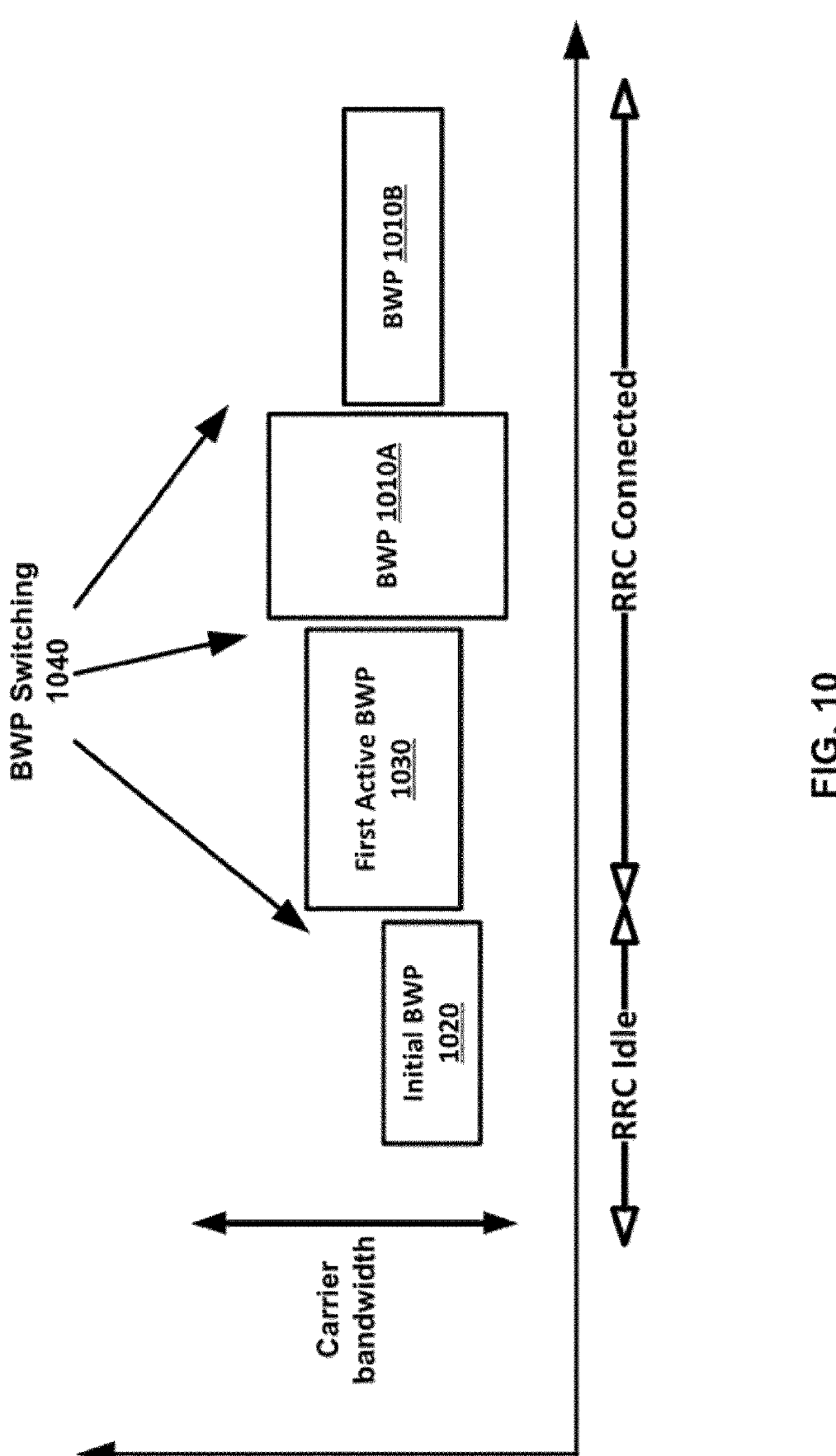
FIG. 10 shows example bandwidth part configuration and switching according to some aspects of one or more exemplary embodiments of the present disclosure.

FIG. 10 shows example bandwidth part configuration and switching according to some aspects of one or more exemplary embodiments of the present disclosure. The UE may be configured with one or more Bandwidth Parts (BWPs) 1010 (e.g., 1010A, 1010B) on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example, through BWP switching

1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
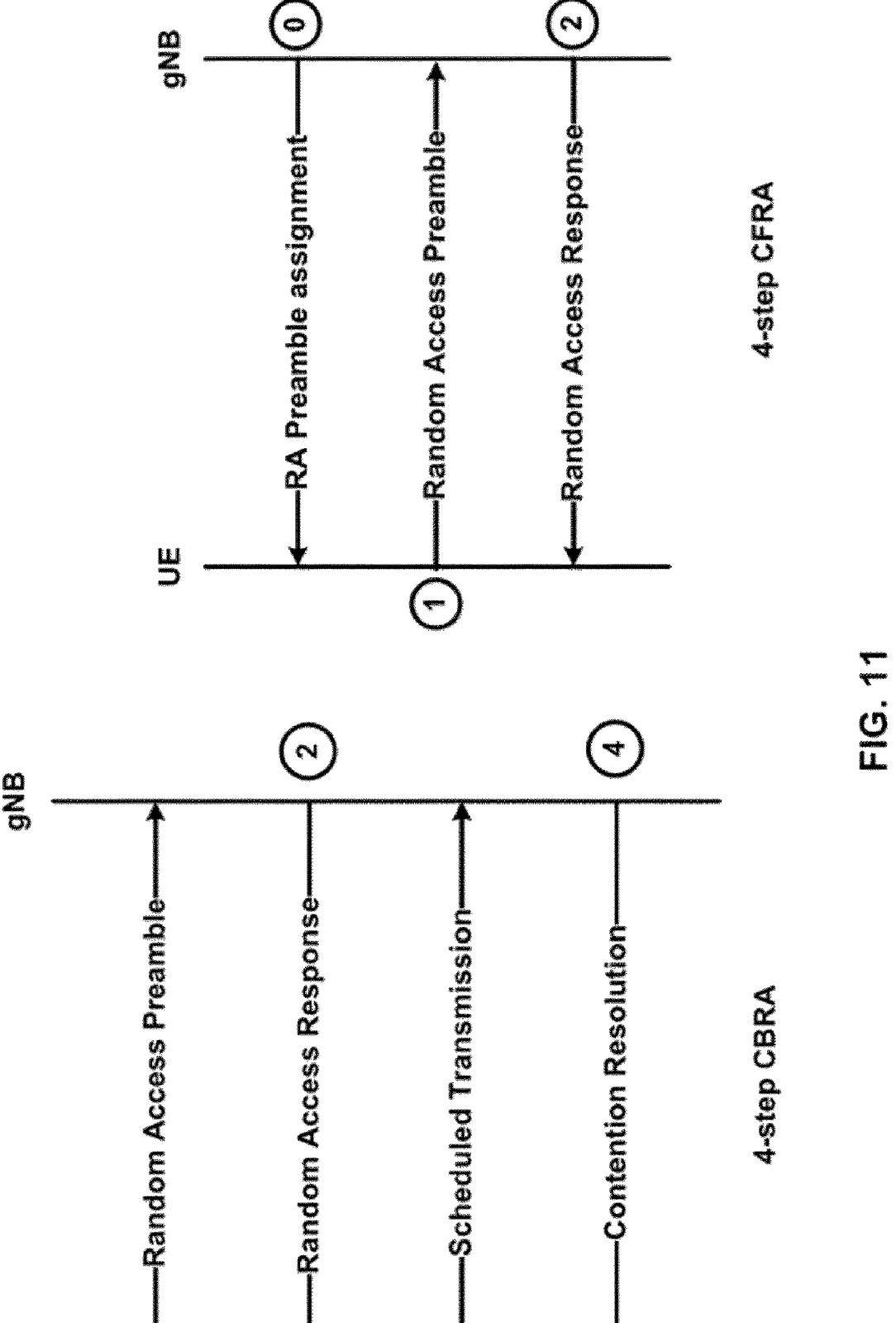
FIG. 11 shows example four-step contention-based and contention-free random access processes according to some aspects of one or more exemplary embodiments of the present disclosure.
Figure 12:
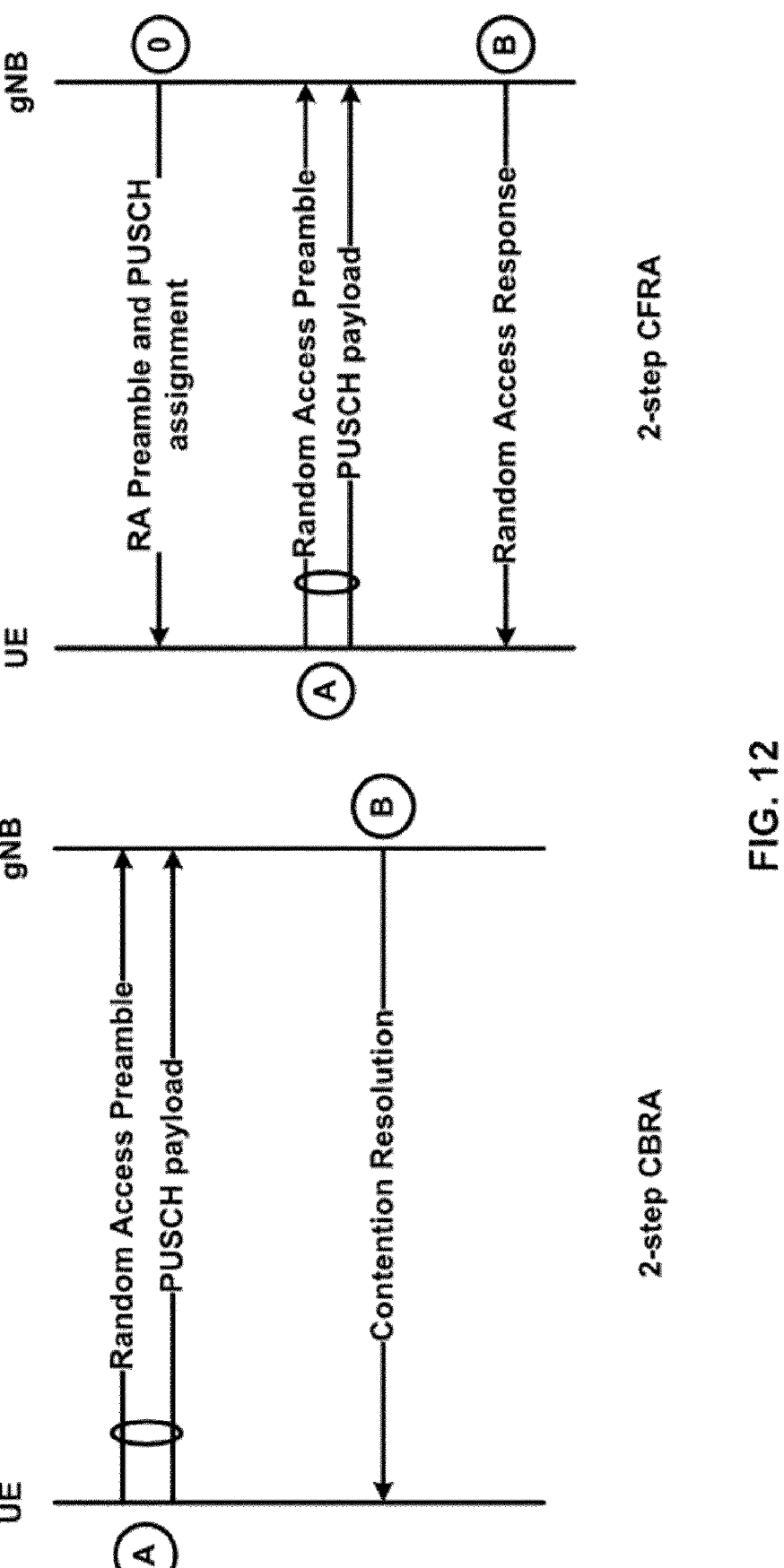
FIG. 12 shows example two-step contention-based and contention-free random access processes according to some aspects of one or more exemplary embodiments of the present disclosure.

FIG. 11 shows example four-step contention-based random access (CBRA) and contention-free random access (CFRA) processes according to some aspects of one or more exemplary embodiments of the present disclosure. FIG. 12 shows example two-step contention-based random access (CBRA) and contention-free random access (CFRA) processes according to some aspects of one or more exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g., handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH (Step 1 of CBRA in FIG. 11). After MSG1 transmission, the UE may monitor for a response from the network within a configured window (Step 2 of CBRA in FIG. 11). For CFRA, dedicated preamble for MSG1 transmission may be assigned by the network (Step 0 of CFRA of FIG. 11) and upon receiving Random Access Response (RAR) from the network, the UE may end the random access procedure as shown in FIG. 11 (Steps 1 and 2 of CFRA in FIG. 11). For CBRA, upon reception of the random access response (Step 2 of CBRA in FIG. 11), the UE may send MSG3 using the uplink grant scheduled in the random access response (Step 3 of CBRA in FIG. 11) and may monitor contention resolution as shown in FIG. 11 (Step 4 of CBRA in FIG. 11). If contention resolution is not successful after MSG3 (re)transmission(s), the UE may go back to MSG1 transmission.

The MSGA of the 2-step RA type may include a preamble on PRACH and a payload on PUSCH (e.g., Step A of CBRA in FIG. 12). After MSGA transmission, the UE may monitor for a response from the network within a configured window. For CFRA, dedicated preamble and PUSCH resource may be configured for MSGA transmission (Steps 0 and A of CFRA in FIG. 12) and upon receiving the network response (Step B of CFRA in FIG. 12), the UE may end the random access procedure as shown in FIG. 12. For CBRA, if contention resolution is successful upon receiving the network response (Step B of CBRA in FIG. 12), the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
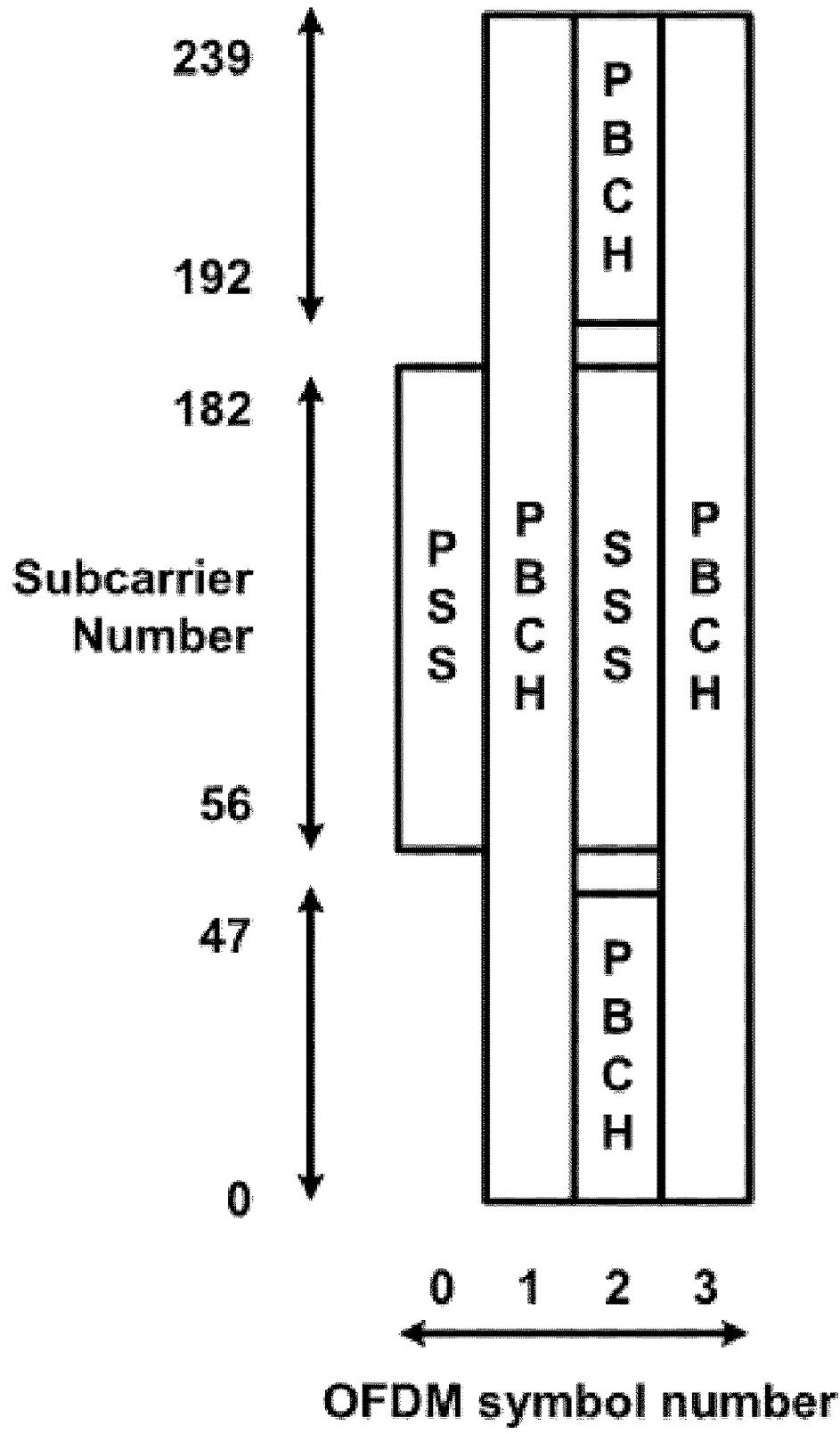
FIG. 13 shows example time and frequency structure of Synchronization Signal and Physical Broadcast Channel (PBCH) Block (SSB) according to some aspects of one or more exemplary embodiments of the present disclosure.

FIG. 13 shows example time and frequency structure of Synchronization Signal and Physical Broadcast Channel (PBCH) Block (SSB) according to some aspects of one or more exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
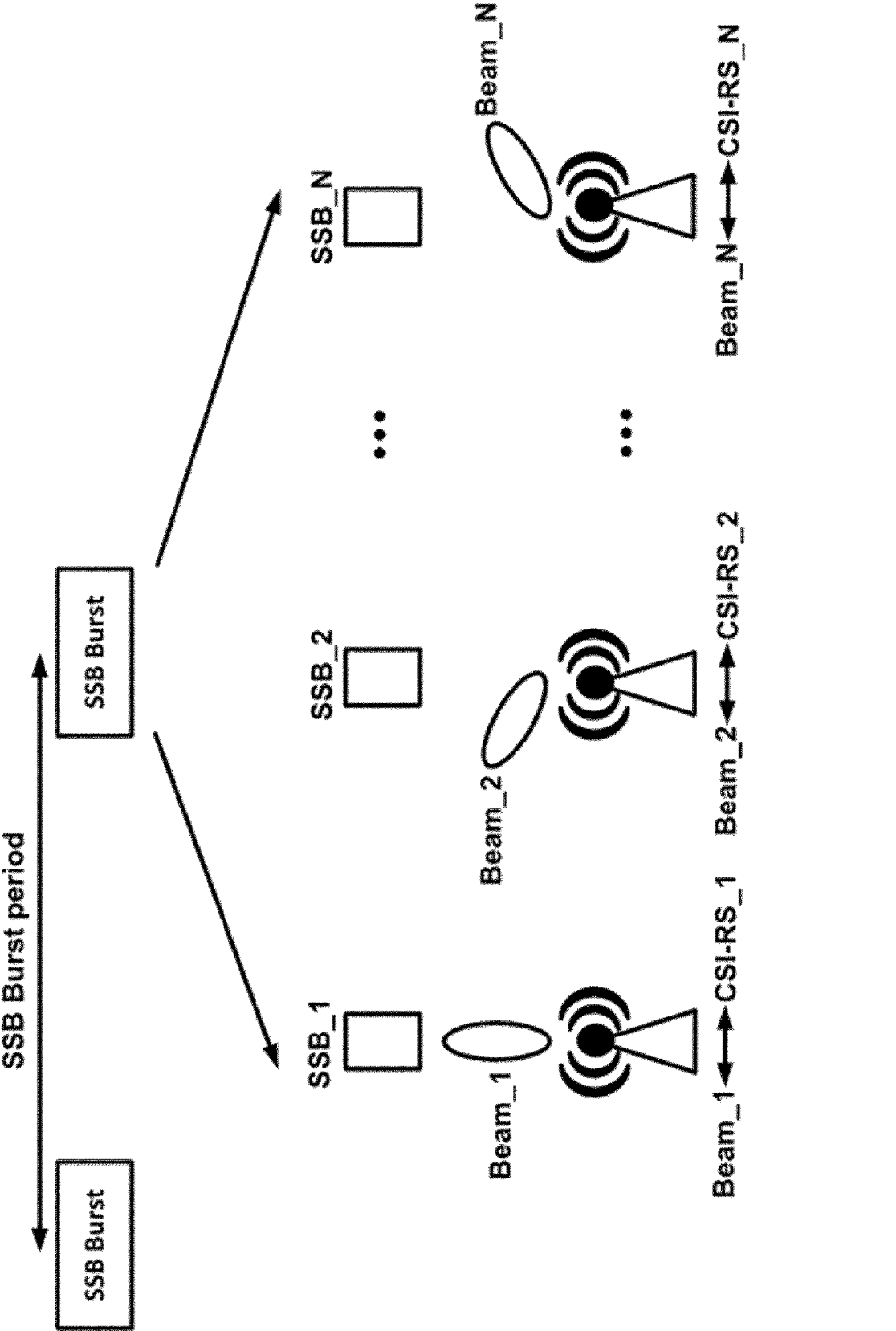
FIG. 14 shows example SSB burst transmissions according to some aspects of one or more exemplary embodiments of the present disclosure.

FIG. 14 shows example SSB burst transmissions according to some aspects of one or more exemplary embodiments of the present disclosure. An SSB burst may include N SSBs (e.g., SSB_1, SSB_2, . . . , SSB_N) and each SSB of the N SSBs may correspond to a beam (e.g., Beam_1, Beam_2, . . . , Beam_N). The SSB bursts may be transmitted according to a periodicity (e.g., SSB burst period). During a contention-based random access process, a UE may perform a random access resource selection process, wherein the UE first selects an SSB before selecting an RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource (e.g., CSI-RS_1, CSI-RS_2, . . . , CSI-RS_N). A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
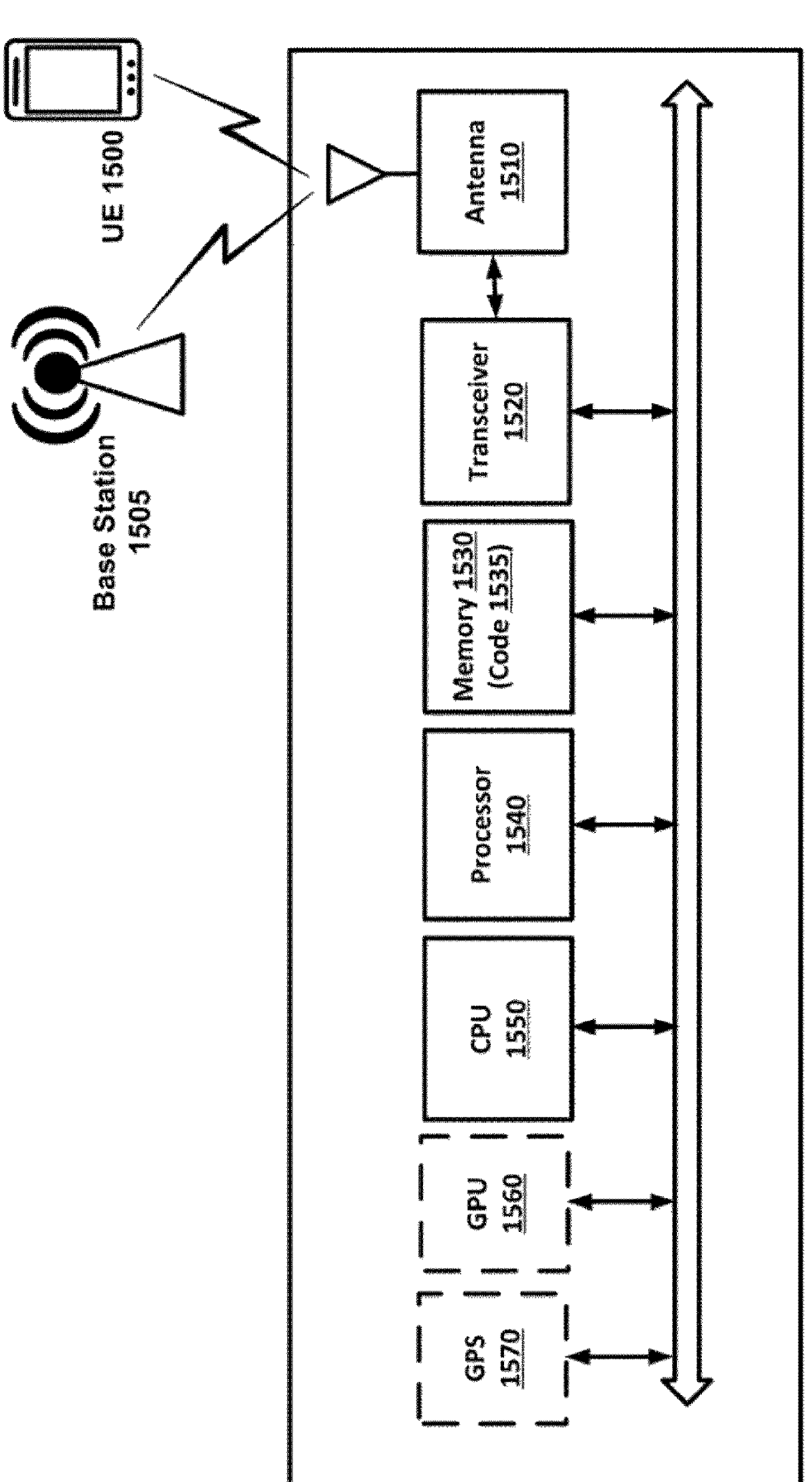
FIG. 15 shows example components of a user equipment and a base station for transmission and/or reception according to some aspects of one or more exemplary embodiments of the present disclosure.

FIG. 15 shows example components of a user equipment and a base station for transmission and/or reception according to some aspects of one or more exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment (UE) 1500. Accordingly, the components illustrated in FIG. 15 are not necessarily limited to either a UE or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antenna 1510 for transmission, and to demodulate packets received from the Antenna 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The CPU 1550 may perform basic arithmetic, logic, controlling, and Input/output (I/O) operations specified by the computer instructions in the Memory 1530. The UE 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the UE 1500 and/or the base station 1505. The GPS 1570 may be used for enabling location-based services or other services for example based on geographical position of the UE 1500.

In some examples, a UE may operate in a plurality of modes for resource allocation in sidelink including scheduled resource allocation and UE autonomous resource selection. In the scheduled resource allocation, the UE may be in RRC_CONNECTED for transmission of data. The NG-RAN/base station may schedule transmission resources. In the UE autonomous resource selection, the UE may transmit data when inside NG-RAN coverage, irrespective of which RRC state the UE may be in, and when outside NG-RAN coverage. The UE may autonomously select transmission resources from resource pool(s). In some examples, for NR sidelink communication, the UE may perform sidelink transmissions only on a single carrier.

In some examples, for scheduled resource allocation, the NG-RAN/base station may dynamically allocate resources to the UE via the SL-RNTI on PDCCH(s) for NR sidelink communication.

In some examples, the NG-RAN may allocate sidelink resources to a UE with two types of configured sidelink grants, e.g., type 1 and type 2. With type 1 configured sidelink grants, the RRC may directly provide the configured sidelink grant only for NR sidelink communication. With type 2 configured sidelink grants, the RRC may define the periodicity of the configured sidelink grants while PDCCH may signal and activate the configured sidelink grants, or may deactivate them. The PDCCH may be addressed to SL-CS-RNTI for NR sidelink communication. In some examples, the NG-RAN may semi-persistently allocate sidelink resources to the UE via the V-RNTI on PDCCH(s) for V2X sidelink communication. In some examples, for the UE performing NR sidelink communication, there may be more than one configured sidelink grant activated at a time on the carrier configured for sidelink transmission. In some examples, when beam failure or physical layer problem occurs on MCG, the UE may continue using the configured sidelink grant Type 1 until initiation of the RRC connection re-establishment procedure. During handover, the UE may be provided with configured sidelink grants via handover command, regardless of the type. If provided, the UE may activate the configured sidelink grant Type 1 upon reception of the handover command or execution of conditional handover (CHO).

In some examples, the UE may send sidelink buffer status report to support scheduler operation in NG-RAN. The sidelink buffer status reports may refer to the data that is buffered in for a group of logical channels (LCG) per destination in the UE. In some examples, eight LCGs may be used for reporting of the sidelink buffer status reports. Two formats, which may be SL BSR and truncated SL BSR, may be used.

In some examples, for autonomous resource selection, the UE may autonomously select sidelink resource(s) from resource pool(s) provided by broadcast system information or dedicated signaling while inside NG-RAN coverage or by preconfiguration while outside NG-RAN coverage. For NR sidelink communication, the resource pool(s) may be provided for a given validity area where the UE may not need to acquire a new pool of resources while moving within the validity area, at least when this pool is provided by SIB. The NR SIB area scope mechanism may be reused to enable validity area for SL resource pool configured via broadcasted system information. In some examples, the UE may be allowed to temporarily use UE autonomous resource selection with random selection for sidelink transmission based on configuration of the exceptional transmission resource pool.

In some examples, two sidelink resource allocation modes may be supported: mode 1 and mode 2. In mode 1, the sidelink resource allocation may be provided by the network. In mode 2, the UE may decide the SL transmission resources in the resource pool(s).

In some examples, sidelink HARQ feedback may use PSFCH and may be operated in one of two options. In one option, which may be configured for unicast and groupcast, PSFCH may transmit ACK or NACK using a resource dedicated to a single PSFCH transmitting UE. In another option, which may be configured for groupcast, PSFCH transmits NACK, or no PSFCH signal may be transmitted, on a resource that may be shared by multiple PSFCH transmitting UEs. In some examples, in sidelink resource allocation mode 1, a UE which received PSFCH may report sidelink HARQ feedback to gNB via PUCCH or PUSCH.

In some examples, the NG-RAN may provide RRCReconfiguration to the UE to provide the UE with dedicated sidelink configuration. The RRCReconfiguration may include SL DRB configuration(s) for NR sidelink communication and mode 1 resource configuration and/or mode 2 resource configuration. If the UE has received SL DRB configuration via system information, the UE may continue using the configuration to perform sidelink data transmissions and receptions until a new configuration is received via the RRCReconfiguration.

In some examples, a UE may be configured by higher layers with one or more sidelink resource pools. A sidelink resource pool may be for transmission of PSSCH or for reception of PSSCH and may be associated with sidelink resource allocation mode 1 or sidelink resource allocation mode 2.

In some examples, in the frequency domain, a sidelink resource pool may comprise of numSubchannel contiguous sub-channels. A sub-channel may comprise of subchannel-size contiguous PRBs, where numSubchannel and subchannelsize are higher layer parameters.

In some examples, in sidelink resource allocation mode 2, the UE may measure RSRP for resource selection as follows: PSSCH-RSRP over the DM-RS resource elements for the PSSCH according to the received SCI format 1-A if higher layer parameter sl-RS-ForSensing is set to pssch, and PSCCH-RSRP over the DM-RS resource elements for the PSCCH carrying to the received SCI format 1-A if higher layer parameter sl-RS-ForSensing is set to pscch.

In some examples, the UE may use a procedure for determining the subset of resources to be reported to higher layers in PSSCH resource selection in sidelink resource allocation mode 2. In some example, in resource allocation mode 2, the higher layer may request the UE to determine a subset of resources from which the higher layer may select resources for PSSCH/PSCCH transmission. To trigger this procedure, in slot n, the higher layer may provide the following parameters for this PSSCH/PSCCH transmission: the resource pool from which the resources are to be reported; L1 priority, $prio_{TX}$; the remaining packet delay budget; the number of sub-channels to be used for the PSSCH/PSCCH transmission in a slot, $L_{subCH}$; optionally, the resource reservation interval, $P_{rsvp\_TX}$, in units of ms. If the higher layer requests the UE to determine a subset of resources from which the higher layer may select resources for PSSCH/PSCCH transmission as part of re-evaluation or pre-emption procedure, the higher layer may provide a set of resources ($r_0$, $r_1$, $r_2$, . . . ) which may be subject to re-evaluation and a set of resources ($r'_0$, $r'_1$, $r'_2$, . . . ) which may be subject to pre-emption. It may be up to UE implementation to determine the subset of resources as requested by higher layers before or after the slot $r''_j$-$T_3$, where $r''_i$ may be the slot with the smallest slot index among ($r_0$, $r_1$, $r_2$, . . . ) and ($r'_0$, $r'_1$, $r'_2$, . . . ), and $T_3$ may be equal to $T^{SL}_{proc,1}$.

In some examples, the following higher layer parameters affect this procedure: t2min_SelectionWindow: internal parameter $T_{2min}$ is set to the corresponding value from higher layer parameter t2min_SelectionWindow for the given value of $prior_{TX}$; SL-ThresRSRP_pi_pj: this higher layer parameter provides an RSRP threshold for each combination ($P_i$,$P_j$), where $P_i$ is the value of the priority field in a received SCI format 1-A and $P_j$ is the priority of the transmission of the UE selecting resources; for a given invocation of this procedure, $p_j$=$prio_{TX}$; RSforSensing selects if the UE uses the PSSCH-RSRP or PSCCH-RSRP measurement; sl-ResourceReservePeriodList; t0_SensingWindow: internal parameter $T_0$ is defined as the number of slots corresponding to t0_SensingWindow ms; sl-xPercentage: internal parameter X for a given $prior_{TX}$ is defined as sl-xPercentage ($prior_{TX}$) converted from percentage to ratio; p_preemption: internal parameter $prio_{pre}$ is set to the higher layer provided parameter p_preemption. In some examples, the resource reservation interval, $P_{rsvp\_TX}$, if provided, may be converted from units of ms to units of logical slots, resulting in $P'_{rsvp\_TX}$.

In some examples, an IE SL-ConfigDedicatedNR may specify the dedicated configuration information for NR sidelink communication. The IE SL-ConfigDedicatedNR may comprise a sl-MeasConfigInfoToAddModList field indicating the RSRP measurement configurations for unicast destinations to add and/or modify. A sl-MeasConfigInfo ToReleaseList field may indicate the RSRP measurement configurations for unicast destinations to remove. A sl-RadioBearerToAddModList field may indicate one or multiple sidelink radio bearer configurations. A NetworkControlledSyncTx field may indicate whether the UE may transmit synchronisation information (e.g., become synchronisation source). A sl-maxNumConsecutiveDTX field may indicate the maximum number of consecutive HARQ DTX before triggering sidelink RLF. A sl-FreqInfo ToAddMod-List field may indicate the NR sidelink communication configuration on some carrier frequency (ies). A sl-RLC-BearerToAddModList field may indicate one or multiple sidelink RLC bearer configurations. A sl-ScheduledConfig field may indicate the configuration for UE to transmit NR sidelink communication based on network scheduling. A sl-CSI-Acquisition field may indicate whether CSI reporting is enabled in sidelink unicast. A sl-CSI-Scheduling RequestId field may indicate the scheduling request configuration applicable for sidelink CSI report MAC CE. A sl-SSB-PriorityNR field may indicate the priority of NR sidelink SSB transmission and reception.

When UEs operate using sidelink, a sidelink design that is based on an always-on mechanism may result in considerable power consumption. Example embodiments may enhance the power saving for UEs operating in sidelink. Power saving may be important for the use case of public safety and pedestrian UEs in case of V2X scenarios, where UEs may have limited battery capacity. Example power saving may be based on partial sensing sidelink resource allocation and random resource selection sidelink resource allocation. The partial sensing may be used for mode-2 sidelink operation. A sub-set of subframes/slots/symbols may be monitored/sensed during a sensing window. The partial sensing may lead to power saving by reducing power consumption due to the shorter time duration of the sensing mechanism. The partial sensing may enable reducing power consumption at the expense of an increase in resource collision probability. The increase in resource collision probability may be due to the UE not being capable of collecting the complete channel occupancy information due to the reduced sensing time.

Depending on the uses case (e.g., V2X use cases, public safety use cases, etc.) traffic may be aperiodic or periodic in nature. In case of periodic traffic, a configuration parameter (e.g., an RRC parameter gapCandidateSensing) may be used to determine the subframe/slot/symbol indices (e.g., in multiple of 100 ms) to perform channel sensing.

In some examples, a sidelink may support unicast and groupcast transmissions and functionalities for unicast and groupcast (e.g. HARQ feedback) may be exploited to improve the performance of partial sensing. The reduced sensing window may result in significant increase in collision probability which may not be desirable for many critical use cases such as public safety. Physical layer functionalities in unicast and groupcast transmissions in the sidelink (e.g. HARQ feedback) may be utilized to improve partial sensing performance.

In some examples, re-evaluation and pre-emption may be effective in improved performance for mode-2 resource allocation, e.g., in partial sensing. The re-evaluation and pre-emption may enable reducing the collision and reliability without considerable cost on power consumption.

Referring to FIG. 15, in some examples, the UE 1500 may be configured to or programmed to be a first UE for a mobile communication network including sidelink transmissions. The UE 1500 may include a memory (e.g., memory 1530 of FIG. 15) storing instructions (e.g., code 1535 of FIG. 15) and a processor (e.g., processor 1540 of FIG. 15) configured to execute the instructions to determine, based on a first sidelink resource allocation process, first radio resources for one or more first sidelink transport blocks; transmit, to a second UE (not shown), the one or more first sidelink transport blocks based on the first radio resources; receive first hybrid automatic repeat request (HARQ) feedbacks for the one or more first sidelink transport blocks; determine whether to switch from the first sidelink resource allocation process to a second sidelink resource allocation process based on the HARQ feedbacks; determine, in response to a determination to switch to the second sidelink resource allocation process, second radio resources for one or more second sidelink transport blocks based on the second sidelink resource allocation process; and transmit the one or more second sidelink transport blocks based on the second radio resources. In these examples, the memory of the UE 1500 (e.g., memory 1530) may store computer program codes (e.g., code 1535) that are executable by a processor (e.g., CPU 1550) to perform the functions of the UE 1500.

In some examples, the UE 1500 may be configured to or programmed to be a second UE for a mobile communication network including sidelink transmissions. The UE 1500 may include a memory (e.g., memory 1530 of FIG. 15) storing instructions (e.g., code 1535 of FIG. 15) and a processor (e.g., processor 1540 of FIG. 15) configured to execute the instructions to receive, from a first UE (not shown), one or more first sidelink transport blocks determined by the first UE based on a first sidelink resource allocation process; transmit, to the first UE, first hybrid automatic repeat request (HARQ) feedbacks for the one or more first sidelink transport blocks; and receive, from the first UE, in response to a determination to switch to a second sidelink resource allocation process by the first UE, one or more second sidelink transport blocks determined by the first UE based on the second sidelink resource allocation process. The second UE may send the HARQ feedbacks via a base station (e.g., base station 1505). In these examples, the memory of the UE 1500 (e.g., memory 1530) may store computer program codes (e.g., code 1535) that are executable by a processor (e.g., CPU 1550) to perform the functions of the UE 1500.

In some examples, the UE 1500 and the base station 1505 are included in a system for a mobile communication including sidelink transmissions. The UE 1500 may be configured to or programmed to be a first UE of the system. The system may include a second UE (not shown). The first UE may be configured to or programmed to determine, based on a first sidelink resource allocation process, first radio resources for one or more first sidelink transport blocks and transmit the one or more first sidelink transport blocks based on the first radio resources. The second UE may be configured to or programmed to receive the one or more first sidelink transport blocks and transmit first hybrid automatic repeat request (HARQ) feedbacks for the one or more first sidelink transport blocks to the first UE. The first UE may be further configured to or programmed to determine whether to switch from the first sidelink resource allocation process to a second sidelink resource allocation process based on the HARQ feedbacks; determine, in response to a determination to switch to the second sidelink resource allocation process, second radio resources for one or more second sidelink transport blocks based on the second sidelink resource allocation process; and transmit, to the second UE, the one or more second sidelink transport blocks based on the second radio resources.

Figure 16:
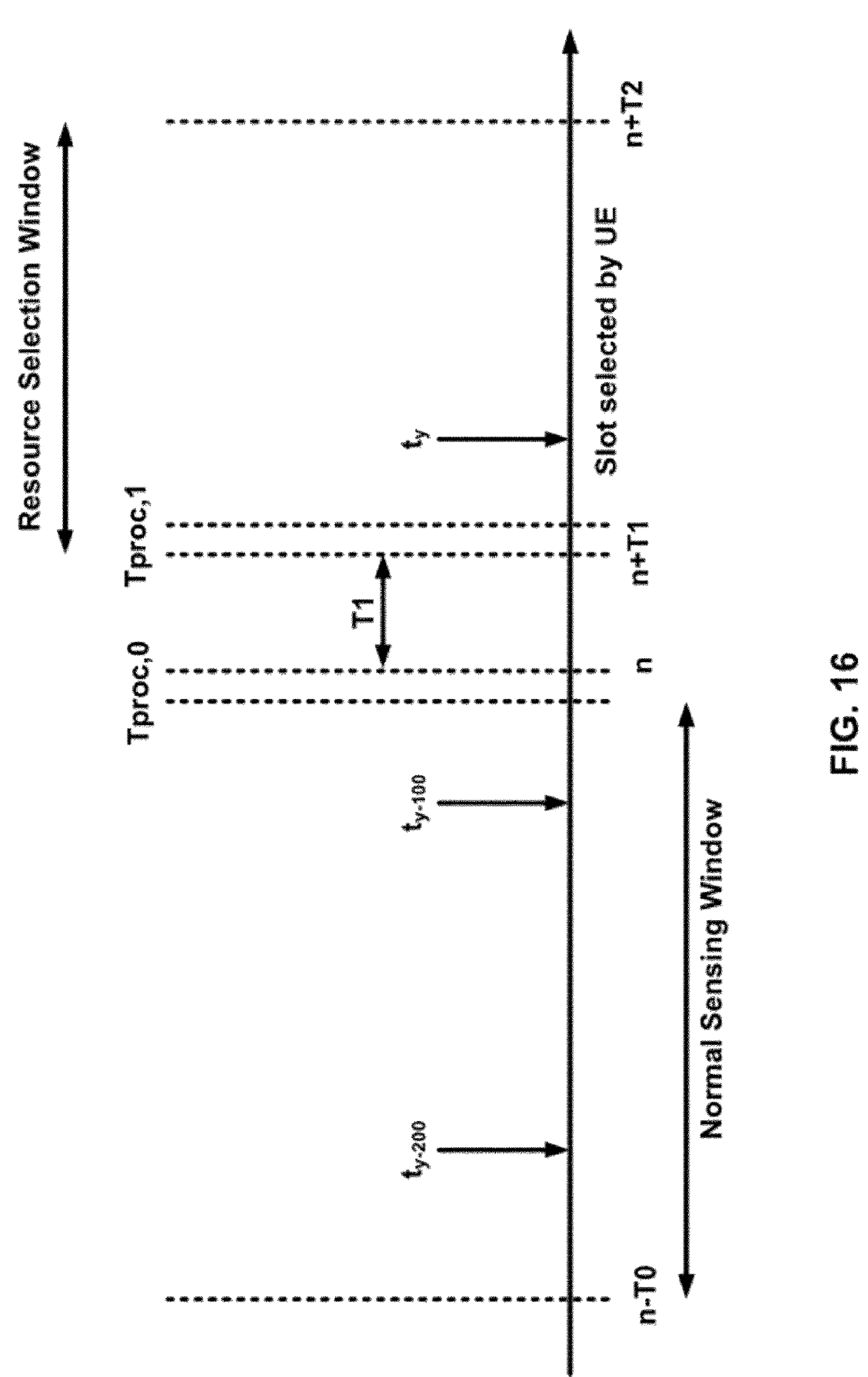
FIG. 16 shows an example sidelink resource selection procedure using partial sensing according to some aspects of some of one or more exemplary embodiments of the present disclosure.

FIG. 16 shows an example partial sensing mechanism for sidelink resource allocation assuming periodic traffic and based on pre-configured sensing occasions. For example, a slot selected by the UE may be at time $t_y$, which may be selected by the UE in a resource selection window. The UE may sense the channel in a sensing window (e.g., at time occasions $t_y-100$ and $t_y-200$).

In some examples, partial sensing may be used considering aperiodic nature of traffic. It may not be efficient to (pre-)configure the sensing occasions within the sensing window assuming certain periodicity. In some examples, different traffic types with different periodicities (e.g., relatively short or long periodicities) may be available (e.g. 1:99, 100, 200, 300, 400, 500, 600, 700, 800, 900, 1000 in milliseconds). The partial sensing mechanism may be enhanced to consider the aperiodic traffic or periodic traffic with various periodicities.

In some examples, when the partial sensing is (pre-) configured for a resource pool, a UE may perform reduced sensing at limited sensing occasions. In some examples, a minimum number of consecutive sensing occasions (e.g., may be referred to as partial sensing window as shown in the FIG. 17) may be (pre-)configured whose length may be less than or smaller than normal sensing window.

Figure 17:
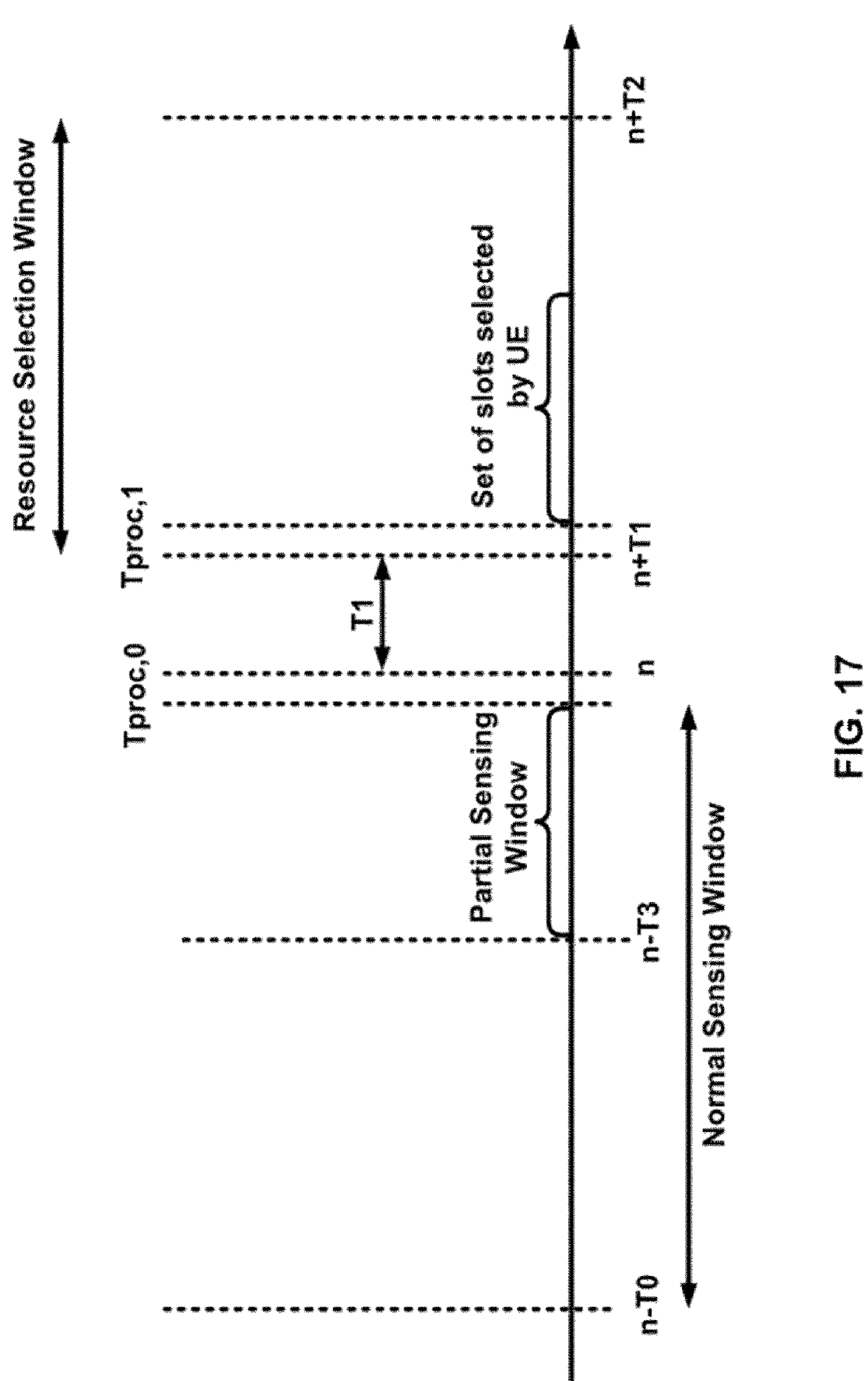
FIG. 17 shows an example sidelink resource selection procedure using partial sensing according to some aspects of some of various one or more exemplary embodiments of the present disclosure.

An example (pre-)configuration of the partial sensing window is shown in FIG. 17, the partial sensing window duration may be defined to be $[n-T_3, n-T_{proc,0})$, where the $T_3$ value may be chosen by UE with a certain range. In some examples, the value of $T_3$ may be adapted to optimize the performance of partial sensing.

In some examples, in random resource selection mechanisms, a UE may select resources randomly for transmission during its resource selection phase without a previous sensing phase or (re-)evaluation phase.

In some examples, for example, as shown in FIG. 18, a UE may perform a selection between random resource selection and partial-window sensing based on packet reception reliability. In some examples, the proportion of ACKs and NACKs may be used to select between random resource selection and partial-window sensing. In some examples, the UE may use random selection as the first mode of transmission resource selection and may transmit sidelink transport blocks based on the determined radio resources. The UE may receive, from the recipient UE, one or more HARQ ACK/NACK in response to its transmission. If the ratio of NACKs, $R=NACKs/(ACKs+NACKs)$, in a moving interval T exceeds a threshold $R_0$, (e.g., $R>R_0$), the UE may stop random resource selection and may begin partial window sensing.

Figure 19:
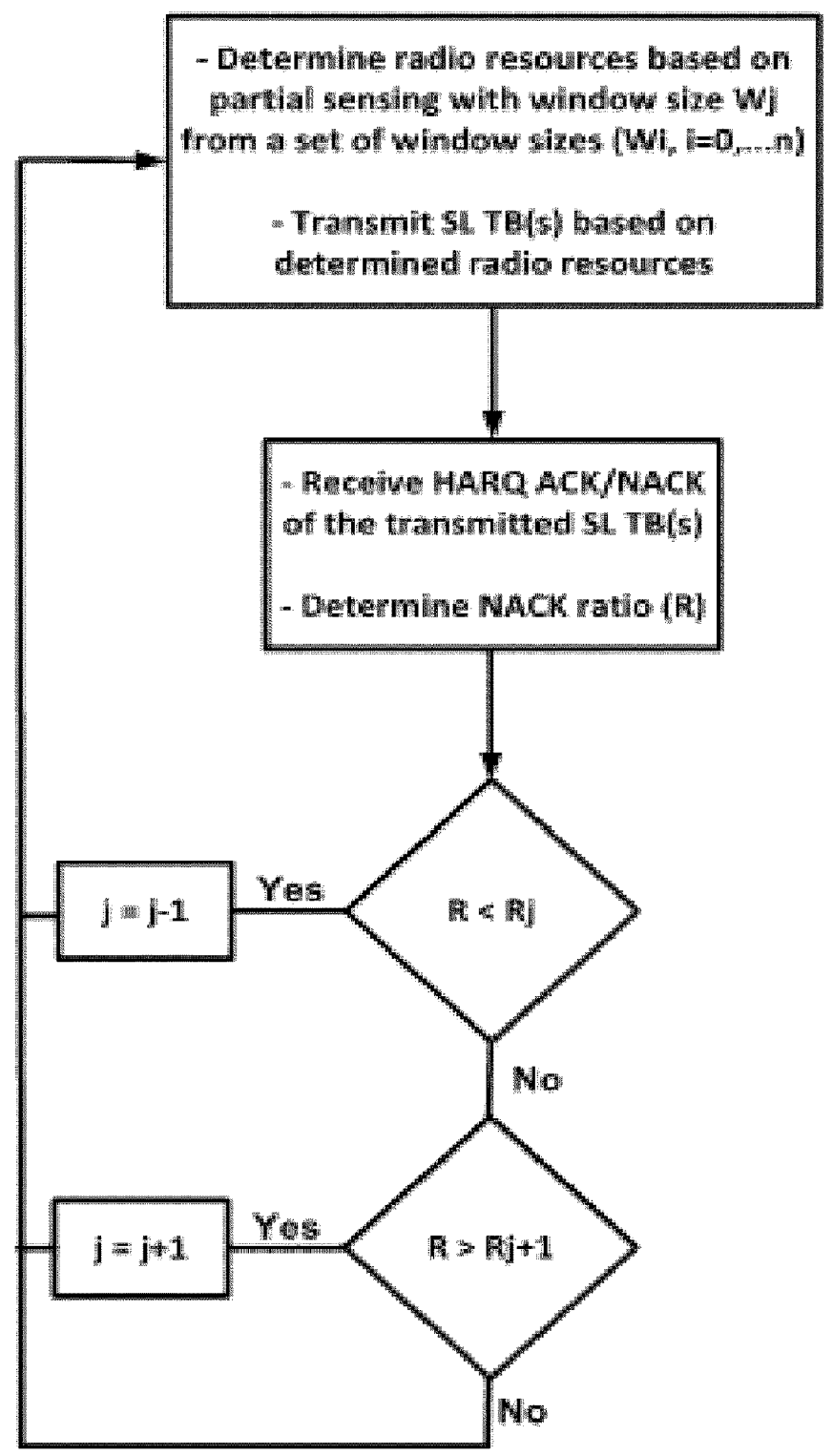
FIG. 19 shows an example process according to some aspects of one or more exemplary embodiments of the present disclosure.

In some examples, for example, as shown in FIG. 19, the partial-sensing window size may be modified based on the proportion of ACKs and NACKs. The UE may use partial window sensing selection as its mode of transmission resource selection, with initial window size $W_0$. There may be a set of window sizes $W_i$ with i=0, 1, . . . , n. The UE may receive an ACK or a NACK in response to its transmission from the recipient UE. In one embodiment, the proportion of the ACKs or NACKs may be represented as a percentage of the total feedback received (e.g., a sum of the ACKs and NACKs). For example, if the ratio of NACKs, $R=NACKs/(ACKs+NACKs)$, in a moving interval T exceeds a threshold $R_1$, e.g., $R>R_1$, the UE may increase the window size to $W_1$. After the next transmission, if $R<R_1$, the UE may decrease the window size to $W_0$. If $R>R_2$, the UE may increase the window size to $W_2$. Otherwise the UE may continue using window size $W_1$. The process may continue for a set of NACK ratios $R_i$ with i=1, 2, . . . , n with corresponding window sizes $W_i$.

In some examples, both of the resource allocation methods, random or partial-window, and the partial-sensing window size may be based on the proportion of ACKs and NACKs, such as a percentage of ACKs or NACKs based on a count of received feedback. The two adaptive schemes described previously may be combined. For example, the UE may use random selection as the first mode of transmission resource selection. The UE may receive, from the recipient UE, an ACK or a NACK in response to its transmission. If the ratio of NACKs, $R=NACKs/(ACKs+NACKs)$, in a moving interval T exceeds a threshold $R_0$, e.g., $R>R_0$, the UE may stop random resource selection and may begin partial window sensing, with initial window size $W_0$. There may be a set of window sizes $W_i$ with i=0, 1, . . . , n. After the next transmission, if $R<R_0$, the UE may return to random selection transmission resource selection. If $R>R_1$, the UE may increase the window size to $W_1$. Otherwise the UE may continue using window size $W_0$. The process may continue for a set of NACK ratios $R_i$ with i=1, 2, . . . , n, where if $R<R_1$, the UE may decrease the window size to $W_{i-1}$. If $R>R_{i+1}$, the UE may increase the window size to $W_1$. Otherwise, the UE may continue using window size $W_i$.

In some examples, the gNB may control the resource selection process using control messages. The messages may include one, several or all of the following messages. For example, the gNB message may direct the UE to use random resource selection, partial window sensing resource selection or partial window sensing with adaptive window size resource selection. For example, the gNB message may direct the UE to use either fixed or adaptive partial window sensing resource selection. For example, the gNB message may direct the UE to adaptively chose to use either random resource selection or partial window sensing resource selection. In some example, the gNB message may provide the parameters to be used by the UE in adaptive resource selection such as the moving interval T, a set of window sizes Wi with i=0, 1, . . . , n, and a set of NACK ratios $R_i$ with i=1, 2, . . . , n.

Figure 20:
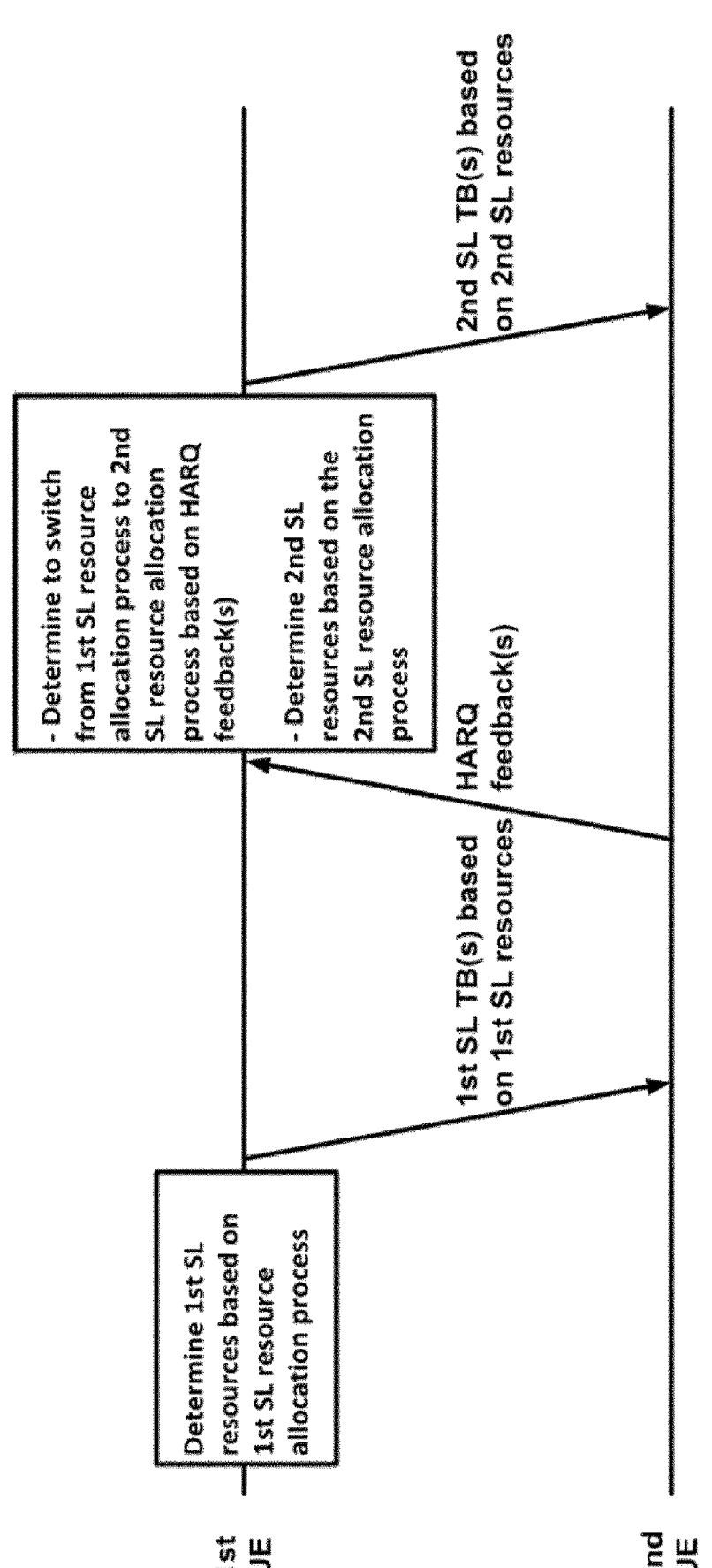
FIG. 20 shows an example process according to some aspects of one or more exemplary embodiments of the present disclosure.

In an example embodiment as shown in FIG. 20, a first UE may receive one or more messages comprising configuration parameters for sidelink operation on a cell. One or more resource pools for sidelink communications may be configured on the cell. The first UE may be configured to adaptively select from a plurality of sidelink resource allocation/selection processes. The plurality of sidelink resource allocation/selection processes may be used by the first UE in a sidelink mode-2 operation. The plurality of sidelink resource allocation/selection may comprise a full sensing resource allocation/selection, a partial sensing resource allocation/selection, and a random resource selection resource allocation/selection process. For example, the configuration parameters may comprise a first parameter indicating that the UE is allowed to select from the plurality of configured resource allocation/selection processes. In an example, the first UE may transmit a capability message comprising a capability information element indicating that the UE is capable of adaptively selecting from a plurality of resource allocation/selection processes and the UE may receive the first parameter in response to transmitting the capability message.

The first UE may use a first resource allocation/selection process, from the plurality of resource allocation/selection processes, and may determine first radio resources for transmission of one or more first sidelink transport blocks to a second UE. In an example, the first resource allocation/selection process may be one of a full sensing process, a partial sensing process, or a random resource selection process. In an example, the first resource allocation/selection process may be a random resource selection process. The first UE may determine the first radio resources according to a mode-2 sidelink operation. The first UE may transmit the one or more sidelink transport blocks using the determined first radio resources. In response to transmitting the one or more first sidelink transport blocks, the first UE may receive HARQ feedback (HARQ ACK/NACK) associated with the one or more first sidelink transport blocks. In an example, the first UE may receive the HARQ feedback in a time interval with a duration. In an example, the time interval may be a moving time interval. For example, at a time instant, the UE may consider the one or more HARQ feedback received within the time interval received prior to the time instant. In an example, the duration of the time interval may be pre-determined/pre-configured. In an example, the configuration parameters received by the first UE may comprise a parameter indicating the duration of the time interval.

The first UE may determine whether to switch from the first resource allocation/selection process to a second resource allocation/selection process based on the received HARQ feedback. In an example, the second resource allocation/selection process may be at least one of: a full sensing resource allocation/selection process, a partial sensing resource allocation/selection process, or a random resource selection resource allocation/selection process. In an example, the second resource allocation/selection process may be a partial sensing resource allocation/selection process. The partial sensing (e.g., as shown in FIG. 17), in response to switching from the first resource allocation/selection process (random resource selection process) to the second resource allocation/selection process (partial sensing process), may be a first size. For example, the configuration parameters received by the first UE may comprise a parameter indicating the first size. In an example, the first size may have a pre-configured/pre-determined value. The first UE may determine whether to switch from the first resource allocation/selection process to a second resource allocation/selection process based on a ratio/percentage of HARQ NACKs to the number of received HARQ feedback (e.g., a sum of received HARQ ACKs and HARQ NACKs). For example, the HARQ feedback may comprise a first number of HARQ NACKs and a second number of HARQ ACKs. The first UE may determine whether to switch from the first resource allocation/selection process to the second resource allocation/selection process based on the ratio (first number)/(first number+second number) being larger than or exceeding a first threshold. In an example, the configuration parameters received by the first UE may define the first threshold. In an example, the first threshold may have a pre-determined/pre-configured value.

The first UE may use the second resource allocation/selection process and may determine second radio resources for transmission of one or more second sidelink transport blocks. The first UE may transmit the one or more second sidelink transport blocks based on the determined second radio resources.

In response to transmitting the one or more second sidelink transport blocks, the first UE may receive second HARQ feedback (HARQ ACK/NACK) associated with the one or more second sidelink transport blocks. In an example, the first UE may receive the second HARQ feedback in a time interval with a duration. In an example, the time interval may be a moving time interval. For example, at a time instant, the UE may consider the one or more HARQ feedback received within the time interval received prior to the time instant. In an example, the duration of the time interval may be predetermined/pre-configured. In an example, the configuration parameters received by the first UE may define the duration of the time interval.

In an example, the first UE may determine to switch from the partial sensing resource allocation/selection process to the random resource selection resource allocation/selection process based on a ratio of HARQ NACKs to a number of received second HARQ feedback (e.g., a sum of received HARQ ACKs and HARQ NACKs). For example, the second HARQ feedback may comprise a third number of HARQ NACKs and a fourth number of HARQ ACKs. The first UE may determine to switch from the partial sensing resource allocation/selection process to the random resource selection resource allocation/selection process based on the ratio (third number)/(third number+fourth number) being less than or smaller than a second threshold. In an example, the configuration parameters received by the first UE may define the second threshold. In an example, the second threshold may have a pre-determined/pre-configured value.

In an example, the first UE may determine to increase the partial sensing window size, from the first size to a second size, based on the second HARQ feedback. For example, the second HARQ feedback may comprise a third number of HARQ NACKs and a fourth number of HARQ ACKs. The first UE may determine to increase the partial sensing window size, from the first size to a second size based on the ratio (third number)/(third number+fourth number) being larger than a third threshold. In an example, the configuration parameters received by the first UE may define the third threshold. In an example, the third threshold may have a pre-determined/pre-configured value. In an example, the configuration parameters received by the first UE may define the first size and the second size.

In an example, the first UE may determine to maintain the first size of the partial sensing window size based on the second HARQ feedback. For example, the second HARQ feedback may comprise a third number of HARQ NACKs and a fourth number of HARQ ACKs related to the second sidelink resource allocation process. The first UE may determine to increase the partial sensing window size, from the first size to a second size based on the ratio (third number)/(third number+fourth number) being larger than a second threshold and less than or smaller than a third thresholds. In an example, the configuration parameters received by the first UE may comprise parameters indicating the second threshold and the third threshold. In an example, the second threshold and the third threshold may have pre-determined/pre-configured values.

In an example, the first UE may determine to decrease the partial sensing window size, from the first size to a third size, based on the second HARQ feedback. For example, the second HARQ feedback may comprise a third number of HARQ NACKs and a fourth number of HARQ ACKs. The first UE may determine to decrease the partial sensing window size, from the first size to a third size based on the ratio (third number)/(third number+fourth number) being less than or smaller than a fourth threshold. In an example, the configuration parameters received by the first UE may comprise a parameter indicating the fourth threshold. In an example, the fourth threshold may have a pre-determined/pre-configured value. In an example, the configuration parameters received by the first UE may define the first size and the third size.

In an example, the first UE may receive configuration parameters of the partial sensing resource allocation/selection process and the parameters for adaptation of the parameters of the partial sensing resource allocation/selection process from the base station. For example, the configuration parameters may indicate a plurality of values for the partial sensing window size. For example, the configuration parameters may define or specify one or more NACK ratios wherein each configured value of the NACK ratio may correspond to a partial sensing window size.

Figure 21:
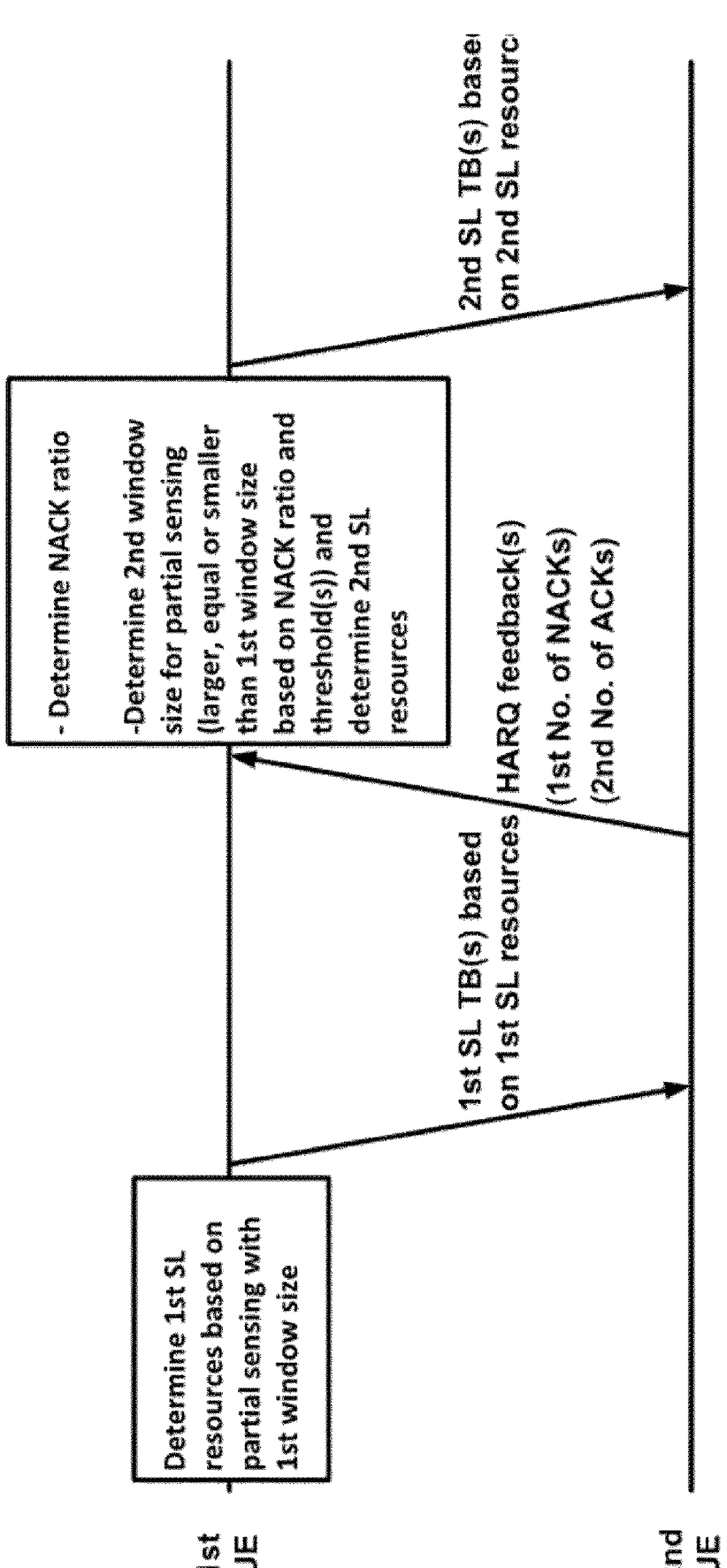
FIG. 21 shows an example process according to some aspects of one or more exemplary embodiments of the present disclosure.

In an example embodiment as shown in FIG. 21, a first UE may receive one or more messages comprising configuration parameters for sidelink operation on a cell. One or more resource pools for sidelink communications may be configured on the cell. The UE may be configured to use a partial sensing resource allocation/selection process (e.g., in mode-2 sidelink operation). The first UE may be configured with partial sensing resource allocation/selection process with adaptive window size. For example, the first UE may receive a configuration parameter including information indicating that the first UE is allowed to use partial sensing resource allocation/selection process with adaptive window size. For example, the first UE may transmit, in a capability message, a capability information element indicating that the first UE is capable of using a partial sensing resource allocation/selection process with an adaptive window size. The first UE may use the partial sensing resource allocation/selection process and may determine first radio resources for transmission of one or more first sidelink transport blocks. The first UE may use a first window size for the partial sensing resource allocation/selection process.

The first UE may transmit the one or more first sidelink transport blocks based on the determined first radio resources. In response to transmitting the one or more first sidelink transport blocks, the first UE may receive HARQ feedback (HARQ ACK/NACK) associated with the one or more first sidelink transport blocks. The HARQ feedback may comprise a first number of NACKs and a second number of ACKs. In an example, the first UE may receive the HARQ feedback in a time interval with a duration. In an example, the time interval may be a moving time interval. For example, at a time instant, the UE may consider the one or more HARQ feedback received within the time interval received prior to the time instant. In an example, the duration of the time interval may be pre-determined/pre-configured. In an example, the configuration parameters received by the first UE may comprise a parameter indicating the duration of the time interval.

The first UE may determine a NACK ratio as a ratio of the first number of the NACKs to a total number of received HARQ feedback (e.g., a sum of the first number of the NACKs and the second number of the ACKs). The first UE may use the partial sensing resource allocation/selection with a window size that is greater or larger, equal, or less than or smaller than the first window size (e.g., the first windows size used for determination of the first radio resources) depending on the NACK ratio, e.g., the ratio (first number of NACKs)/(sum of the first number of NACKs and the second number of ACKs) and by comparing the NACK ratio with one or more thresholds. In an example, the first UE may receive configuration parameters indicating the one or more thresholds. In an example, the one or more thresholds may have pre-configured/pre-determined values. The first UE may determine second radio resources with the partial sensing resource allocation/selection process with the updated (or maintained) window size. The first UE may transmit one or more second transport blocks based on the determined second radio resources.

In an embodiment, a first user equipment (UE) may determine, based on a first sidelink resource allocation process, first radio resources for one or more first sidelink transport blocks. The first UE may transmit, to a second UE, the one or more first sidelink transport blocks based on the first radio resources. The first UE may receive, in response to transmitting the one or more first sidelink transport blocks, hybrid automatic repeat request (HARQ) feedback for the one or more first sidelink transport blocks. The first UE may determine whether to switch from the first sidelink resource allocation process to a second sidelink resource allocation process based on the HARQ feedback. In response to determining to switch from the first sidelink resource allocation process to the second sidelink resource allocation process, the first UE may determine second radio resources for one or more second sidelink transport blocks based on the second sidelink resource allocation process. The first UE may transmit the one or more second sidelink transports block based on the second radio resources.

In some embodiments, the HARQ feedback may comprise a first number of negative acknowledgements (NACKs) and a second number of positive acknowledgements (ACKs). The first UE may determine to switch from the first sidelink resource allocation process to the second sidelink resource allocation process based on a ratio of the first number of NACKs to a sum of the first number of NACKs and the second number of ACKs being greater than or larger than a first threshold.

In some embodiments, the first UE may receive a configuration parameter defining the first threshold.

In some embodiments, the HARQ feedback may be received within a time window with a duration. In some embodiments, the first UE may receive a configuration parameters indicating the duration of the time window.

In some embodiments, the first sidelink resource allocation process may be at least one of: a full sensing process, a partial sensing process and, or a random resource selection process.

In some embodiments, the second sidelink resource allocation process may be at least one of: a full sensing resource allocation process, a partial sensing resource allocation process and, or a random resource selection resource allocation process.

In some embodiments, the first resource allocation process may be a random resource selection resource allocation process; and the second resource allocation process may be a partial sensing resource allocation process. In some embodiments, a partial sensing window size of the partial sensing resource allocation process, in response to switching from the random resource selection resource allocation process to the partial sensing resource allocation process, may be a first size. In some embodiments, the first UE may receive a configuration parameter defining the first size.

In some embodiments, the first UE may receive second hybrid automatic repeat request (HARQ) feedback, for the one or more second sidelink transport blocks, in response to transmitting the one or more second sidelink transport blocks. In some embodiments, the first UE may receive the second hybrid automatic repeat request (HARQ) feedback within a time window with a duration. In some embodiments, the first UE may receive a configuration parameter defining the duration of the time window. In some embodiments, the first UE may determine to switch from the partial sensing resource allocation process to the random resource selection resource allocation process based on the second hybrid automatic repeat request (HARQ) feedback. In some embodiments, the second HARQ feedback may comprise a third number of negative acknowledgements (NACKs) and a fourth number of positive acknowledgements (ACKs); and the determining to switch from the partial sensing resource allocation process to the random resource selection resource allocation process may be based on a ratio of the third number of NACKs to a sum of the third number of NACKS and the fourth number of ACKs being less than or smaller than a second threshold. In some embodiments, the first UE may receive a configuration parameter defining the second threshold.

In some embodiments, the first UE may determine to increase the partial sensing window size, from the first size to a second size, based on the second HARQ feedback. In some embodiments, the second HARQ feedback may comprise a third number of negative acknowledgements (NACKs) and a fourth number of positive acknowledgements (ACKs). The determining to increase the partial sensing window size, from the first size to a second size may be based on a ratio of the third number of NACKs to a sum of the third number of NACKS and the fourth number of ACKs being greater than or larger than a third threshold. In some embodiments, the first UE may receive a configuration parameter defining the third threshold. In some embodiments, the first UE may receive configuration parameters indicating the first size and the second size.

In some embodiments, the first UE may determine to maintain the first size of the partial sensing window size based on the second HARQ feedback. In some embodiments, the second HARQ feedback may comprise a third number of negative acknowledgements (NACKs) and a fourth number of positive acknowledgements (ACKs). The determining to maintain the first size of the partial sensing window size may be based on a ratio of the third number of NACKs to a sum of the third number of NACKS and the fourth number of ACKs being larger than a second threshold and less than or smaller than a third threshold. In some embodiments, the first UE may receive configuration parameters defining the second threshold and the third threshold.

In some embodiments, the first UE may determine to decrease the partial sensing window size, from the first size to a third size based on the second HARQ feedback. In some embodiments, the second HARQ feedback may comprise a third number of negative acknowledgements (NACKs) and a fourth number of positive acknowledgements (ACKs); and the determining to decrease the partial sensing window size, from the first size to the third size may be based on a ratio of the third number of NACKs to a sum of the third number of NACKS and the fourth number of ACKs being less than or smaller than a fourth threshold. In some embodiments, the first UE may receive a configuration parameter defining the fourth threshold.

In some embodiments, the first UE may receive a plurality of values for the partial sensing window size. The first UE may receive a plurality of negative acknowledgement (NACK) ratio thresholds, wherein each value, in the plurality of values of the partial sensing window size, may correspond to a NACK ratio threshold in the plurality of NACK ratio thresholds.

In some embodiments, the first UE may receive a configuration parameter defining that the first UE is allowed to switch between the first sidelink resource allocation process and the second sidelink resource allocation process.

In an embodiment, a first UE may determine, based on a partial sensing resource allocation process associated with a first window size, first radio resources for one or more first sidelink transport blocks. The first UE may transmit to a second UE, the one or more first sidelink transport blocks based on the first radio resources. The first UE may receive, in response to transmitting the one or more first transport blocks, hybrid automatic repeat request (HARQ) feedback for the one or more first sidelink transport blocks, wherein the HARQ feedback may comprise a first number of number of negative acknowledgements (NACKs) and a second number of positive acknowledgements (ACKs). The first UE may determine a NACK ratio based on a ratio of the first number of NACKs to a sum of the first number of NACKs and the second number of ACKs. The first UE may determine, based on the partial sensing resource allocation process associated with a second window size, second radio resources for one or more second sidelink transport blocks, wherein the second window size may be greater than or larger than, less than or smaller than or equal to the first window size based on comparing the NACK ratio with one or more thresholds. The first UE may transmit the one or more second sidelink transport blocks based on the second radio resources.

In some embodiments, the first UE may receive configuration parameters defining the one or more thresholds.

In some embodiments, the hybrid automatic repeat request (HARQ) feedbacks may be received within a time window with a duration. In some embodiments, the first UE may receive a configuration parameter defining the duration of the time window.

In some embodiments, the first UE may receive a configuration parameter including information that the first UE is allowed to adaptively change a window size of the partial sensing resource selection process.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of sidelink resource selection, comprising:
  determining, by a first user equipment (UE), based on a first sidelink resource allocation process, first radio resources for one or more first sidelink transport blocks;
  transmitting, by the first UE to a second UE, the one or more first sidelink transport blocks based on the first radio resources;
  receiving, by the first UE, first hybrid automatic repeat request (HARQ) feedback for the one or more first sidelink transport blocks;
  determining, by the first UE, whether to switch from the first sidelink resource allocation process to a second sidelink resource allocation process based on the HARQ feedback;
  responsive to a determination to switch to the second sidelink resource allocation process, determining, by the first UE, second radio resources for one or more second sidelink transport blocks based on the second sidelink resource allocation process; and
  transmitting, by the first UE, the one or more second sidelink transport blocks based on the second radio resources.

Clause 2. The method of Clause 1, wherein the HARQ feedback is based on a first number of negative acknowledgements (NACKs) and a second number of positive acknowledgements (ACKs), wherein determining whether to switch from the first sidelink resource allocation process to a second sidelink resource allocation process is based on whether a proportion of the first number of NACKs and the second number of ACKs is greater than first threshold.

Clause 3. The method of Clause 2, wherein the proportion corresponds to a ratio of the first number of NACKs to a sum of the first number of NACKs and the second number of ACKs.

Clause 4. The method of Clause 2 further comprising receiving a configuration parameter, wherein the received configuration parameter defines the first threshold.

Clause 5. The method of Clause 1, wherein receiving the HARQ feedback includes receiving the HARQ feedback within a first time window.

Clause 6. The method of Clause 5 further comprising receiving a configuration parameter, wherein the received configuration parameter defines a duration of the first time window.

Clause 7. The method of Clause 1, wherein the first sidelink resource allocation process corresponds to at least one of a full sensing process, a partial sensing process, and a random resource selection process.

Clause 8. The method of Clause 1, wherein the second sidelink resource allocation process is one of a partial sensing resource allocation process and a random resource selection resource allocation process.

Clause 9. The method of Clause 1, wherein:
the first sidelink resource allocation process is a random resource selection resource allocation process; and
the second sidelink resource allocation process is a partial sensing resource allocation process.

Clause 10. The method of Clause 9, wherein a partial sensing window size of the partial sensing resource allocation process corresponds to a first size.

Clause 11. The method of Clause 10 further comprising the first UE receiving a configuration parameter indicating the first size.

Clause 12. The method of Clause 9 further comprising receiving, by the first UE, second HARQ feedback, related to the transmitting of the one or more second sidelink transport blocks.

Clause 13. The method of Clause 12, wherein receiving, by the first UE, the second HARQ feedback includes receiving the second HARQ feedback within a second time window.

Clause 14. The method of Clause 13 further comprising receiving a configuration parameter, wherein the received configuration parameter defines a duration of the second time window.

Clause 15. The method of Clause 12 further comprising determining to switch to the random resource selection resource allocation process based on the second HARQ feedback.

Clause 16. The method of Clause 15, wherein the second HARQ feedback is based on a third number of NACKs and a fourth number of ACKs, the method further comprising determining, by the first UE, to switch to the random resource selection resource allocation process based on whether a ratio of the third number of NACKs to a sum of the third number of NACKS and the fourth number of ACKs is less than a second threshold.

Clause 17. The method of Clause 16 further comprising receiving a configuration parameter, wherein the received configuration parameter defines the second threshold.

Clause 18. The method of Clause 12, further comprising determining, by the first UE, to increase the partial sensing window size based on the second HARQ feedback.

Clause 19. The method of Clause 18, wherein the second HARQ feedback is based on a third number of NACKs and a fourth number of ACKs, the method further comprising determining to increase the partial sensing window size based on a ratio of the third number of NACKs to a sum of the third number of NACKS and the fourth number of ACKs being greater than a third threshold.

Clause 20. The method of Clause 19 further comprising receiving a configuration parameter, wherein the received configuration parameter defines the third threshold.

Clause 21. The method of Clause 19 wherein determining to increase the partial sensing window size includes determining to increase the partial sensing window size to a second size, the method further comprising receiving configuration parameters, wherein the received configuration parameter defines the second size.

Clause 22. The method of Clause 12, wherein the switching to the partial sensing resource allocation process includes defining a first size of a partial sensing window size of the partial sensing resource allocation process; and
further comprising determining to maintain the first size of the partial sensing window size based on the second hybrid automatic repeat request (HARQ) feedback.

Clause 23. The method of Clause 22, wherein the second HARQ feedback is based on a third number of NACKs and a fourth number of ACKs, the method further comprising, determining, by the first UE, to maintain the first size of the partial sensing window size based on whether a ratio of the third number of NACKs to a sum of the third number of NACKS and the fourth number of ACKs being greater than a second threshold and smaller than a third threshold.

Clause 24. The method of Clause 22, further comprising the first UE receiving configuration parameters, wherein the received configuration parameter defines the second threshold and the third threshold.

Clause 25. The method of Clause 22 further comprising determining, by the first UE, to decrease the partial sensing window size, from the first size to a third size, based on the second hybrid automatic repeat request (HARQ) feedback.

Clause 26. The method of Clause 25, wherein the second HARQ feedback is based on a third number of NACKs and a fourth number of ACKs, the method further comprising, determining, by the first UE, to decrease the partial sensing window size based on whether a ratio of the third number of NACKs to a sum of the third number of NACKS and the fourth number of ACKs is less than a fourth threshold.

Clause 27. The method of Clause 26 further comprising receiving a configuration parameter, wherein the received configuration parameter defines the fourth threshold.

Clause 28. The method of Clause 1 further comprising:
receiving a plurality of values for a partial sensing window size of the partial sensing resource allocation process; and
receiving a plurality of NACK ratio thresholds; wherein individual NACK ratio thresholds are associated with the plurality of values for the partial sensing window size.

Clause 29. The method of Clause 1 further comprising receiving a configuration parameter, wherein the received configuration parameter includes information indicating that the first UE is allowed to switch between the first sidelink resource allocation process and the second sidelink resource allocation process.

Clause 30. A method of sidelink resource selection, comprising the steps of:
determining, by a first user equipment (UE), based on a partial sensing resource allocation process associated with a first window size, first radio resources for one or more first sidelink transport blocks;

transmitting, by the first UE to a second UE, the one or more first sidelink transport blocks based on the first radio resources;

receiving, by the first UE, hybrid automatic repeat request (HARQ) feedback for the one or more first sidelink transport blocks, wherein the HARQ feedback is based on a first number of negative acknowledgements (NACKs) and a second number of positive acknowledgements (ACKs);

identifying, by the first UE, a NACK ratio of the first number of NACKs to a sum of the first number of NACKs and the second number of ACKs;

determining, by the first UE, based on the partial sensing resource allocation process associated with a second window size, second radio resources for one or more second sidelink transport blocks, wherein the second window size is larger than, smaller than or equal to the first window size based on comparing the NACK ratio with one or more thresholds; and transmitting, by the first UE, the one or more second sidelink transport blocks based on the second radio resources.

Clause 31. The method of Clause 30 further receiving configuration parameters, wherein the received configuration parameter defines the one or more thresholds.

Clause 32. The method of Clause 30, wherein receiving the HARQ feedback for the one or more first sidelink transport blocks includes receiving the HARQ feedback within a time window.

Clause 33. The method of Clause 32 further comprising receiving a configuration parameter, wherein the received configuration parameter defines indicating the duration of the time window.

Clause 34. The method of Clause 30 further comprising receiving a configuration parameter, wherein the received configuration parameter includes information indicating that the first user equipment (UE) is allowed to adaptively change a window size of the partial sensing resource selection process.

Clause 35. An apparatus for utilization in wireless communications comprising:

an antenna for use in transmission of electromagnetic signals;

a memory for maintaining computer-readable code; and a processor for executing the computer-readable code that causes the apparatus to:

determine based on a first sidelink resource allocation process, first radio resources for one or more first sidelink transport blocks;

transmit the one or more first sidelink transport blocks based on the first radio resources;

receive first hybrid automatic repeat request (HARQ) feedback for the one or more first sidelink transport blocks;

determine whether to switch from the first sidelink resource allocation process to a second sidelink resource allocation process based on the HARQ feedback;

responsive to a determination to switch to the second sidelink resource allocation process, determine second radio resources for one or more second sidelink transport blocks based on the second sidelink resource allocation process; and transmit the one or more second sidelink transport blocks based on the second radio resources.

Clause 36. The apparatus of Clause 35, wherein the HARQ feedback is based on a first number of negative acknowledgements (NACKs) and a second number of positive acknowledgements (ACKs), wherein determining whether to switch from the first sidelink resource allocation process to a second sidelink resource allocation process is based on whether a proportion of the first number of NACKs and the second number of ACKs is greater than first threshold.

Clause 37. The apparatus of Clause 36, wherein the proportion corresponds to a ratio of the first number of NACKs to a sum of the first number of NACKs and the second number of ACKs.

Clause 38. The apparatus of Clause 36, wherein the apparatus receives a configuration parameter, wherein the received configuration parameter defines the first threshold.

Clause 39. The apparatus of Clause 35, wherein receiving the HARQ feedback includes receiving the HARQ feedback within a first time window.

Clause 40. The apparatus of Clause 39, wherein the apparatus receives a configuration parameter, wherein the received configuration parameter defines a duration of the first time window.

Clause 41. The apparatus of Clause 35, wherein the first sidelink resource allocation process corresponds to at least one of a full sensing process, a partial sensing process, and a random resource selection process.

Clause 42. The apparatus of Clause 35, wherein the second sidelink resource allocation process is one of a partial sensing resource allocation process and a random resource selection resource allocation process.

Clause 43. The apparatus of Clause 35, wherein:

the first sidelink resource allocation process is a random resource selection resource allocation process; and the second sidelink resource allocation process is a partial sensing resource allocation process.

Clause 44. The apparatus of Clause 43, wherein a partial sensing window size of the partial sensing resource allocation process corresponds to a first size.

Clause 45. The apparatus of Clause 44, wherein the apparatus receives a configuration parameter indicating the first size.

Clause 46. The apparatus of Clause 43, wherein the apparatus receives second HARQ feedback, related to the transmitting of the one or more second sidelink transport blocks.

Clause 47. The apparatus of Clause 46, wherein receiving the second HARQ feedback includes receiving the second HARQ feedback within a second time window.

Clause 48. The apparatus of Clause 46, wherein the apparatus receives a configuration parameter, wherein the received configuration parameter defines a duration of the second time window.

Clause 49. The apparatus of Clause 46, wherein the apparatus determines to switch to the random resource selection resource allocation process based on the second HARQ feedback.

Clause 50. The apparatus of Clause 49, wherein the second HARQ feedback is based on a third number of NACKs and a fourth number of ACKs, the apparatus further comprising determining, by the first UE, to switch to the random resource selection resource allocation process based on whether a ratio of the third number of NACKs to a sum of the third number of NACKS and the fourth number of ACKs is less than a second threshold.

Clause 51. The apparatus of Clause 50, wherein the apparatus receives a configuration parameter, wherein the received configuration parameter defines the second threshold.

Clause 52. The apparatus of Clause 46, further comprising determining, by the first UE, to increase the partial sensing window size based on the second HARQ feedback.

Clause 53. The apparatus of Clause 52, wherein the second HARQ feedback is based on a third number of NACKs and a fourth number of ACKs, the apparatus further comprising determining to increase the partial sensing window size based on a ratio of the third number of NACKs to a sum of the third number of NACKS and the fourth number of ACKs being greater than a third threshold.

Clause 54. The apparatus of Clause 53 wherein the apparatus receives a configuration parameter, wherein the received configuration parameter defines the third threshold.

Clause 55. The apparatus of Clause 53 wherein determining to increase the partial sensing window size includes determining to increase the partial sensing window size to a second size, wherein the apparatus receives configuration parameters, wherein the received configuration parameter defines the second size.

Clause 56. The apparatus of Clause 46, wherein the switching to the partial sensing resource allocation process includes defining a first size of a partial sensing window size of the partial sensing resource allocation process; and further comprising determining to maintain the first size of the partial sensing window size based on the second hybrid automatic repeat request (HARQ) feedback.

Clause 57. The apparatus of Clause 56, wherein the second HARQ feedback is based on a third number of NACKs and a fourth number of ACKs, the apparatus further comprising, determining, by the first UE, to maintain the first size of the partial sensing window size based on whether a ratio of the third number of NACKs to a sum of the third number of NACKS and the fourth number of ACKs being greater than a second threshold and smaller than a third threshold.

Clause 58. The apparatus of Clause 56, wherein the apparatus receives configuration parameters, wherein the received configuration parameter defines the second threshold and the third threshold.

Clause 59. The apparatus of Clause 56, wherein the apparatus determines to decrease the partial sensing window size, from the first size to a third size, based on the second hybrid automatic repeat request (HARQ) feedback.

Clause 60. The apparatus of Clause 59, wherein the second HARQ feedback is based on a third number of NACKs and a fourth number of ACKs, the apparatus further comprising, determining, by the first UE, to decrease the partial sensing window size based on whether a ratio of the third number of NACKs to a sum of the third number of NACKS and the fourth number of ACKs is less than a fourth threshold.

Clause 61. The apparatus of Clause 60 wherein the apparatus receives a configuration parameter, wherein the received configuration parameter defines the fourth threshold.

Clause 62. The apparatus of Clause 35, wherein the apparatus:

receives a plurality of values for a partial sensing window size of the partial sensing resource allocation process; and receives a plurality of NACK ratio thresholds; wherein individual NACK ratio thresholds are associated with the plurality of values for the partial sensing window size.

Clause 63. The apparatus of Clause 35 wherein the apparatus receives a configuration parameter, wherein the received configuration parameter includes information indicating that the first UE is allowed to switch between the first sidelink resource allocation process and the second sidelink resource allocation process.

Clause 64. An apparatus for utilization in wireless communications comprising:

an antenna for use in transmission of electromagnetic signals;

a memory for maintaining computer-readable code; and a processor for executing the computer-readable code that causes the apparatus to:

determine based on a partial sensing resource allocation process associated with a first window size, first radio resources for one or more first sidelink transport blocks;

transmit the one or more first sidelink transport blocks based on the first radio resources;

receive hybrid automatic repeat request (HARQ) feedback for the one or more first sidelink transport blocks, wherein the HARQ feedback is based on a first number of negative acknowledgements (NACKs) and a second number of positive acknowledgements (ACKs);

identify a NACK ratio of the first number of NACKs to a sum of the first number of NACKs and the second number of ACKs;

determine based on the partial sensing resource allocation process associated with a second window size, second radio resources for one or more second sidelink transport blocks, wherein the second window size is larger than, smaller than or equal to the first window size based on comparing the NACK ratio with one or more thresholds; and transmit the one or more second sidelink transport blocks based on the second radio resources.

Clause 65. The apparatus of Clause 64, wherein the apparatus receives configuration parameters, wherein the received configuration parameter defines the one or more thresholds.

Clause 66. The apparatus of Clause 64, wherein receiving the HARQ feedback for the one or more first sidelink transport blocks includes receiving the HARQ feedback within a time window.

Clause 67. The apparatus of Clause 66, wherein the apparatus receives a configuration parameter, wherein the received configuration parameter defines indicating the duration of the time window.

Clause 68. The apparatus of Clause 64, wherein the apparatus receives a configuration parameter, wherein the received configuration parameter includes information indicating that the first user equipment (UE) is allowed to adaptively change a window size of the partial sensing resource selection process.

Clause 69. A method of sidelink resource selection, comprising:

receiving, by a second user equipment (UE) from a first UE, one or more first sidelink transport blocks based on first radio resources determined based on a first sidelink resource allocation process;

transmitting, by the second UE to the first UE, first hybrid automatic repeat request (HARQ) feedback for the one or more first sidelink transport blocks;

responsive to a determination to switch from the first sidelink resource allocation process to a second sidelink resource allocation process based on the HARQ feedback, receiving, from the first UE, one or more second sidelink transport blocks based on a second radio resources determined based on the second sidelink resource allocation process.

Clause 70. A method of sidelink resource selection, comprising:

receiving, by a second user equipment (UE) from a first UE, one or more first sidelink transport blocks based on first radio resources determined based on a partial sensing resource allocation process associated with a first window size;

transmitting, by the second UE to the first UE, hybrid automatic repeat request (HARQ) feedback for the one or more first sidelink transport blocks, wherein the HARQ feedback is based on a first number of negative acknowledgements (NACKs) and a second number of positive acknowledgements (ACKs);

responsive to a determination of second radio resources for one or more second sidelink transport blocks based on the partial sensing resource allocation process associated with a second window size, receiving, by the second UE from the first UE, the one or more second sidelink transport blocks based on the second radio resources, wherein the second window size is larger than, smaller than or equal to the first window size based on comparing a NACK ratio with one or more thresholds, and wherein the NACK ratio is a ratio of the first number of NACKs to a sum of the first number of NACKs and the second number of ACKs.

This application claims the benefit of U.S. Provisional Application No. 63/091,737, entitled "POWER SAVING ENHANCEMENT FOR SIDELINK," and filed on Oct. 12, 2020. U.S. Provisional Application No. 63/091,737 is incorporated by reference herein.

The invention claimed is:

1. A method of sidelink resource selection, comprising:

determining, by a first user equipment (UE), based on a first sidelink resource allocation process according to a mode-2 sidelink operation, first radio resources for one or more first sidelink transport blocks;

transmitting, by the first UE to a second UE, the one or more first sidelink transport blocks based on the first radio resources;

receiving, by the first UE, first hybrid automatic repeat request (HARQ) feedback for the one or more first sidelink transport blocks;

determining, by the first UE, whether to switch from the first sidelink resource allocation process according to the mode-2 sidelink operation to a second sidelink resource allocation process according to the mode-2 sidelink operation based on the HARQ feedback;

responsive to a determination to switch to the second sidelink resource allocation process according to the mode-2 sidelink operation, determining, by the first UE, second radio resources for one or more second sidelink transport blocks based on the second sidelink resource allocation process according to the mode-2 sidelink operation; and transmitting, by the first UE, the one or more second sidelink transport blocks based on the second radio resources, wherein the HARQ feedback is based on a first number of negative acknowledgements (NACKs) and a second number of positive acknowledgements (ACKs), wherein determining whether to switch from the first sidelink resource allocation process to the second sidelink resource allocation process is based on whether a proportion of the first number of NACKs and the second number of ACKs is greater than first threshold, and wherein the proportion corresponds to a ratio of the first number of NACKs to a sum of the first number of NACKs and the second number of ACKs.

2. The method of claim 1, further comprising receiving a configuration parameter, wherein the configuration parameter received defines the first threshold.

3. The method of claim 1, wherein receiving the HARQ feedback includes receiving the HARQ feedback within a first time window.

4. The method of claim 3 further comprising receiving a configuration parameter, wherein the configuration parameter received defines a duration of the first time window.

5. The method of claim 1, wherein the first sidelink resource allocation process corresponds to at least one of a full sensing process, a partial sensing process and a random resource selection process.

6. The method of claim 1, wherein the second sidelink resource allocation process is one of a partial sensing resource allocation process and a random resource selection resource allocation process.

7. The method of claim 1, wherein:

the first sidelink resource allocation process is a random resource selection resource allocation process; and the second sidelink resource allocation process is a partial sensing resource allocation process.

8. The method of claim 7, wherein a partial sensing window size of the partial sensing resource allocation process corresponds to a first size.

9. The method of claim 8 further comprising the first UE receiving a configuration parameter defining the first size.

10. The method of claim 7 further comprising receiving, by the first UE, second HARQ feedback, related to the transmitting of the one or more second sidelink transport blocks.

11. The method of claim 10, wherein receiving, by the first UE, the second HARQ feedback includes receiving the second HARQ feedback within a second time window.

12. The method of claim 11 further comprising receiving a configuration parameter, wherein the configuration parameter received defines a duration of the second time window.

13. The method of claim 10 further comprising determining to switch to the random resource selection resource allocation process based on the second HARQ feedback.

14. The method of claim 13, wherein the second HARQ feedback is based on a third number of NACKs and a fourth number of ACKs, the method further comprising determining, by the first UE, to switch to the random resource selection resource allocation process based on whether a ratio of the third number of NACKs to a sum of the third number of NACKS and the fourth number of ACKs is less than a second threshold.

15. The method of claim 14 further comprising receiving a configuration parameter, wherein the configuration parameter received defines the second threshold.

16. The method of claim 10, further comprising determining, by the first UE, to increase a partial sensing window size based on the second HARQ feedback.

17. A method of sidelink resource selection, comprising:

determining, by a first user equipment (UE), based on a partial sensing resource allocation process associated with a first window size, first radio resources for one or more first sidelink transport blocks;

transmitting, by the first UE to a second UE, the one or more first sidelink transport blocks based on the first radio resources;

receiving, by the first UE, hybrid automatic repeat request (HARQ) feedback for the one or more first sidelink transport blocks, wherein the HARQ feedback is based on a first number of negative acknowledgements (NACKs) and a second number of positive acknowledgements (ACKs);

identifying, by the first UE, a NACK ratio of the first number of NACKs to a sum of the first number of NACKs and the second number of ACKs;

determining, by the first UE, based on the partial sensing resource allocation process associated with a second window size, second radio resources for one or more second sidelink transport blocks, wherein the second window size is larger than, smaller than or equal to the first window size based on comparing the NACK ratio with one or more thresholds; and transmitting, by the first UE, the one or more second sidelink transport blocks based on the second radio resources.

18. A method of sidelink resource selection, comprising:

receiving, by a second user equipment (UE) from a first UE, one or more first sidelink transport blocks based on first radio resources determined based on a first sidelink resource allocation process according to a mode-2 sidelink operation;

transmitting, by the second UE to the first UE, first hybrid automatic repeat request (HARQ) feedback for the one or more first sidelink transport blocks; and responsive to a determination to switch from the first sidelink resource allocation process according to the mode-2 sidelink operation to a second sidelink resource allocation process according to the mode-2 sidelink operation based on the HARQ feedback, receiving, from the first UE, one or more second sidelink transport blocks based on a second radio resources determined based on the second sidelink resource allocation process according to the mode-2 sidelink operation, wherein the HARQ feedback is based on a first number of negative acknowledgements (NACKs) and a second number of positive acknowledgements (ACKs), wherein determining whether to switch from the first sidelink resource allocation process to the second sidelink resource allocation process is based on whether a proportion of the first number of NACKs and the second number of ACKs is greater than first threshold, and wherein the proportion corresponds to a ratio of the first number of NACKs to a sum of the first number of NACKs and the second number of ACKs.

* * * * *